(12) United States Patent
Yu et al.

(10) Patent No.: US 11,320,690 B2
(45) Date of Patent: May 3, 2022

(54) COLOR FILTER SUBSTRATE AND METHOD OF MANUFACTURING THE SAME, LIQUID CRYSTAL DISPLAY PANEL, AND LIQUID CRYSTAL DISPLAY APPARATUS

(71) Applicant: BOE TECHNOLOGY GROUP CO., LTD., Beijing (CN)

(72) Inventors: Meina Yu, Beijing (CN); Weili Zhao, Beijing (CN); Mingxing Liu, Beijing (CN); Rui Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/264,530

(22) PCT Filed: Jun. 17, 2020

(86) PCT No.: PCT/CN2020/096609
§ 371 (c)(1),
(2) Date: Jan. 29, 2021

(87) PCT Pub. No.: WO2020/253731
PCT Pub. Date: Dec. 24, 2020

(65) Prior Publication Data
US 2021/0294152 A1    Sep. 23, 2021

(30) Foreign Application Priority Data
Jun. 21, 2019   (CN) .......................... 201910545071.2

(51) Int. Cl.
*G02F 1/1335*   (2006.01)
*F21V 8/00*   (2006.01)
(Continued)

(52) U.S. Cl.
CPC ..... *G02F 1/133516* (2013.01); *G02B 6/0055* (2013.01); *G02F 1/01791* (2021.01);
(Continued)

(58) Field of Classification Search
CPC ......... G02F 1/133548; G02F 1/133514; G02F 1/133512; G02F 2/02; G02F 2001/01791;
(Continued)

(56) References Cited

U.S. PATENT DOCUMENTS

2015/0253633 A1*   9/2015   Tsuchiya ........... G02F 1/134309
349/96
2017/0102579 A1   4/2017   Wang
(Continued)

FOREIGN PATENT DOCUMENTS

CN   105044974   11/2015
CN   107065293   8/2017
(Continued)

OTHER PUBLICATIONS

English translation for CN-110133909-A, Qin, Guo, Dai (Year: 2019).*
(Continued)

*Primary Examiner* — Michael H Caley
*Assistant Examiner* — Jonathan Y Jung
(74) *Attorney, Agent, or Firm* — Dority & Manning, P.A.

(57) ABSTRACT

A color filter substrate includes: a first base, a first metal wire grid polarizing layer, and first sub-pixel units, second sub-pixel units and third sub-pixel units. The first sub-pixel unit includes a first light conversion pattern emitting light of a second color under excitation of incident light of a first color and a first reflective pattern reflecting the light of the first color and transmitting the light of the second color. The second sub-pixel unit includes a second light conversion pattern emitting light of a third color under the excitation of the incident light of the first color and a second reflective pattern reflecting the light of the first color and transmitting the light of the third color. The third sub-pixel unit is
(Continued)

configured to receive the light of the first color and emit light of a fourth color or the light of the first color.

17 Claims, 10 Drawing Sheets

(51) Int. Cl.
  *G02F 1/13357*  (2006.01)
  *G02F 1/017*  (2006.01)
  *G02F 2/02*  (2006.01)
  *G02F 1/1333*  (2006.01)

(52) U.S. Cl.
  CPC .. *G02F 1/133357* (2021.01); *G02F 1/133512* (2013.01); *G02F 1/133548* (2021.01); *G02F 1/133605* (2013.01); *G02F 1/133617* (2013.01); *G02F 2/02* (2013.01); *G02F 2202/36* (2013.01)

(58) Field of Classification Search
  CPC ... G02F 1/01791; G02B 6/0056; H01L 33/50; H01L 33/507; H05B 33/145
  See application file for complete search history.

(56) References Cited

U.S. PATENT DOCUMENTS

| | | | |
|---|---|---|---|
| 2017/0146857 A1* | 5/2017 | Wang | G02F 1/133617 |
| 2017/0242292 A1* | 8/2017 | Jeon | G02F 1/133509 |
| 2018/0024404 A1* | 1/2018 | Suzuki | G02F 1/133602 |
| | | | 362/84 |
| 2018/0074369 A1* | 3/2018 | Park | G02F 1/133528 |
| 2018/0100956 A1 | 4/2018 | Lee et al. | |
| 2018/0314107 A1* | 11/2018 | Park | G02F 1/133514 |
| 2019/0025634 A1 | 1/2019 | Park et al. | |
| 2021/0240041 A1* | 8/2021 | Park | G02F 1/133617 |

FOREIGN PATENT DOCUMENTS

| | | | |
|---|---|---|---|
| CN | 107797333 | | 3/2018 |
| CN | 109212813 | | 1/2019 |
| CN | 110133909 A | * | 8/2019 |
| CN | 110187751 | | 8/2019 |

OTHER PUBLICATIONS

International Search Report (w/ English Translation) for corresponding PCT Application No. PCT/CN2020/096609, dated Sep. 22, 2020, 8 pages.
First Chinese Office Action (w/ English Translation) for corresponding Chinese Application No. 201910545071.2, 20 pages.

* cited by examiner

COLOR FILTER SUBSTRATE AND METHOD OF MANUFACTURING THE SAME, LIQUID CRYSTAL DISPLAY PANEL, AND LIQUID CRYSTAL DISPLAY APPARATUS

CROSS-REFERENCE TO RELATED APPLICATIONS

This application is a national phase entry under 35 USC 371 of International Patent Application No. PCT/CN2020/096609 filed on Jun. 17, 2020, which claims priority to and the benefit of Chinese Patent Application No. 201910545071.2, filed on Jun. 21, 2019, which are incorporated herein by reference in their entirety.

TECHNICAL FIELD

The present disclosure relates to the field of display technologies, and in particular, to a color filter substrate and a method of manufacturing the same, a liquid crystal display panel, and a liquid crystal display apparatus.

BACKGROUND

With a small size, low power consumption and no radiation, liquid crystal display (LCD) apparatuses occupy a dominant position in the display market at present.

SUMMARY

In one aspect, embodiments of the present disclosure provide a color filter substrate. The color filter substrate includes a first base, a first metal wire grid polarizing layer disposed above the first base, and a plurality of sub-pixel units disposed on a side of the first metal wire grid polarizing layer away from a first surface thereof. The first surface is a surface of the first metal wire grid polarizing layer away from the first base. The plurality of sub-pixel units include a plurality of first sub-pixel units, a plurality of second sub-pixel units and a plurality of third sub-pixel units. A first sub-pixel unit of the plurality of first sub-pixel units includes a first light conversion pattern and a first reflective pattern that are arranged in layers, and the first reflective pattern is disposed on a side of the first light conversion pattern away from the first metal wire grid polarizing layer; the first light conversion pattern is configured to emit light of a second color under excitation of incident light of a first color, and the first reflective pattern is configured to reflect the light of the first color and transmit the light of the second color. A second sub-pixel unit of the plurality of second sub-pixel units includes a second light conversion pattern and a second reflective pattern that are arranged in layers, and the second reflective pattern is disposed on a side of the second light conversion pattern away from the first metal wire grid polarizing layer; the second light conversion pattern is configured to emit light of a third color under the excitation of the incident light of the first color, and the second reflective pattern is configured to reflect the light of the first color and transmit the light of the third color. A third sub-pixel unit of the plurality of third sub-pixel units is configured to receive the light of the first color and emit light of a fourth color or the light of the first color. The light emitted by the first sub-pixel unit, the light emitted by the second sub-pixel unit, and the light emitted by the third sub-pixel unit are light of three primary colors.

In some embodiments, the third sub-pixel unit is configured to emit the light of the first color; the third sub-pixel unit includes a transparent filling pattern. The light of the first color is blue light, and the light of the second color and the light of the third color are red light and green light, respectively.

In some embodiments, the third sub-pixel unit of the plurality of third sub-pixel units is configured to emit light of a fourth color; the third sub-pixel unit includes a third light conversion pattern and a third reflective pattern that are arranged in layers, and the third reflective pattern is disposed on a side of the third light conversion pattern away from the first metal wire grid polarizing layer; the third light conversion pattern is configured to emit the light of the fourth color under the excitation of the incident light of the first color, and the third reflective pattern is configured to reflect the light of the first color and transmit the light of the fourth color.

In some embodiments, a material of the first light conversion pattern includes first quantum dots; and a material of the second light conversion pattern includes second quantum dots. Materials of the first quantum dots and the second quantum dots include at least one of indium phosphide, indium arsenide, cadmium sulfide, cadmium selenide, cadmium telluride, zinc selenide, and zinc sulfide. A diameter of the first quantum dots and a diameter of the second quantum dots are different.

In some embodiments, the first sub-pixel unit further includes a first absorption pattern disposed on a side of the first reflective pattern away from the first light conversion pattern, and the first absorption pattern is configured to absorb the light of the first color and transmit the light of the second color. The second sub-pixel unit further includes a second absorption pattern disposed on a side of the second reflective pattern away from the second light conversion pattern, and the second absorption pattern is configured to absorb the light of the first color and transmit the light of the third color.

In some embodiments, the first reflective pattern and the second reflective pattern both include at least one first reflective sub-pattern and at least one second reflective sub-pattern that are stacked along a thickness direction of the first base. A material of the at least one first reflective sub-pattern and a material of the at least one second reflective sub-pattern both include cholesteric liquid crystal. A helix direction of the cholesteric liquid crystals in the at least one first reflective sub-pattern is left-handed, and a helix direction of the cholesteric liquid crystals in the at least one second reflective sub-pattern is right-handed.

In some embodiments, a thickness of the first reflective sub-pattern is 2 µm to 5 µm; and a thickness of the second reflective sub-pattern is 2 µm to 5 µm.

In some embodiments, a material of the first absorption pattern and a material of the second absorption pattern both include a blue light absorbing dye; and the blue light absorbing dye includes at least one of coumarin and benzotriazole.

In some embodiments, the material of the first absorption pattern is same as the material of the second absorption pattern, and adjacent first absorption pattern and second absorption pattern are formed into a one-piece structure.

In some embodiments, the first absorption pattern is a red filter pattern, and the second absorption pattern is a green filter pattern; and the red filter pattern and the green filter pattern both include a polymer material and an organic dye.

In some embodiments, the color filter substrate further includes a planarization layer disposed between the first metal wire grid polarizing layer and all of the first light conversion pattern, the second light conversion pattern and the transparent filling pattern. The planarization layer and the transparent filling pattern are made of a same material and are formed into a one-piece structure.

In some embodiments, the first sub-pixel unit, the second sub-pixel unit and the third sub-pixel unit are all disposed between the first metal wire grid polarizing layer and the first base.

In some embodiments, the color filter substrate further includes a first light-shielding pattern. The first light-shielding pattern has a grid structure; and each sub-pixel unit is arranged in a respective one of a plurality of squares of the first light-shielding pattern.

In some embodiments, the color filter substrate further includes a second light-shielding pattern. The second light-shielding pattern has a grid structure; and each of the first light conversion pattern, the second light conversion pattern and the transparent filling pattern are arranged in a respective one of a plurality of squares of the second light-shielding pattern. Any adjacent first reflective patterns, any adjacent second reflective patterns, and any adjacent first reflective pattern and second reflective pattern are formed into a one-piece structure.

In some embodiments, the first metal wire grid polarizing layer is further used as a common electrode.

In another aspect, embodiments of the present disclosure provide a liquid crystal display panel. The liquid crystal display panel includes an array substrate and the color filter substrate described above. The array substrate is provided with a polarizing layer, and a polarization direction of the first metal wire grid polarizing layer is parallel or perpendicular to a polarization direction of the polarizing layer.

In some embodiments, the array substrate includes a second base; the polarizing layer is a second metal wire grid polarizing layer, and the second metal wire grid polarizing layer is disposed on a side of the second base proximate to the color filter substrate or away from the color filter substrate.

In yet another aspect, embodiments of the present disclosure provide a liquid crystal display apparatus. The liquid crystal display apparatus includes the liquid crystal display panel described above and a backlight module. The backlight module includes at least one light source and a reflective sheet, and the at least one light source is configured to emit the light of the first color.

In yet another aspect, embodiments of the present disclosure provide a method of manufacturing a color filter substrate. The method includes: forming a plurality of sub-pixel units on a first base, the plurality of sub-pixel units including a plurality of first sub-pixel units, a plurality of second sub-pixel units and a plurality of third sub-pixels units; and forming a first metal wire grid polarizing layer on a side of the plurality of sub-pixel units away from the first base. Forming the first sub-pixel unit, the second sub-pixel unit and the third sub-pixel unit on the first base, includes: forming a first reflective pattern and a second reflective pattern in a first sub-pixel region and a second sub-pixel region on the first base, respectively; forming a first light conversion pattern on the first reflective pattern in the first sub-pixel region; forming a second light conversion pattern on the second reflective pattern in the second sub-pixel region; and forming a transparent filling pattern in a third sub-pixel region on the first base. The first light conversion pattern is configured to emit light of a second color under excitation of incident light of a first color, and the first reflective pattern is configured to reflect the light of the first color and transmit the light of the second color. The second light conversion pattern is configured to emit light of a third color under the excitation of the incident light of the first color, and the second reflective pattern is configured to reflect the light of the first color and transmit the light of the third color. The light of the first color, the light of the second color and the light of the third color are light of three primary colors.

In yet another aspect, embodiments of the present disclosure provide a method of manufacturing a color filter substrate. The method includes: forming a plurality of sub-pixel units on a first base, the plurality of sub-pixel units including a plurality of first sub-pixel units, a plurality of second sub-pixel units and a plurality of third sub-pixels units; and forming a first metal wire grid polarizing layer on a side of the plurality of sub-pixel units away from the first base. Forming the first sub-pixel unit, the second sub-pixel unit and the third sub-pixel unit on the first base, includes: forming a first reflective pattern, a second reflective pattern and a third reflective pattern in a first sub-pixel region, a second sub-pixel region and a third sub-pixel region on the first base, respectively; forming a first light conversion pattern on the first reflective pattern in the first sub-pixel region; forming a second light conversion pattern on the second reflective pattern in the second sub-pixel region; and forming a third light conversion pattern on the third reflective pattern in the third sub-pixel region. The first light conversion pattern is configured to emit light of a second color under excitation of incident light of a first color, and the first reflective pattern is configured to reflect the light of the first color and transmit the light of the second color. The second light conversion pattern is configured to emit light of a third color under the excitation of the incident light of the first color, and the second reflective pattern is configured to reflect the light of the first color and transmit the light of the third color. The third light conversion pattern is configured to emit light of a fourth color under the excitation of the incident light of the first color, and the third reflective pattern is configured to reflect the light of the first color and transmit the light of the fourth color. The light of the second color, the light of the third color and the light of the fourth color are light of three primary colors.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Technical solutions in some embodiments of the present disclosure will be described clearly and completely below with reference to the drawings. Obviously, the described embodiments are merely some but not all embodiments of the present disclosure. All other embodiments obtained by a person of ordinary skill in the art on a basis of the embodiments of the present disclosure shall be included in the protection scope of the present disclosure.

Unless the context requires otherwise, term "comprise" and other forms thereof such as the third-person singular form "comprises" and the present participle form "comprising" throughout the description and the claims are construed as an open and inclusive meaning, i.e., "included, but not limited to". In the description, the terms such as "one embodiment", "some embodiments", "exemplary embodiments", "example", "specific example", or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Terms such as "first" and "second" are used for descriptive purposes only, and are not to be construed as indicating or implying the relative importance or implicitly indicating the number of indicated technical features below. Thus, features defined with "first" and "second" may explicitly or implicitly include one or more of the features. In the description of the embodiments of the present disclosure, term "a/the plurality of" means two or more unless otherwise specified.

In the description of some embodiments, term "connected" and its derivatives may be used. For example, term "connected" may be used in the description of some embodiments to indicate that two or more elements are in direct physical contact or electric contact with each other. However, term "connected" may also mean that two or more elements are not in direct contact with each other but still cooperate or interact with each other. The embodiments disclosed herein are not necessarily limited to the content herein.

Figure 1:
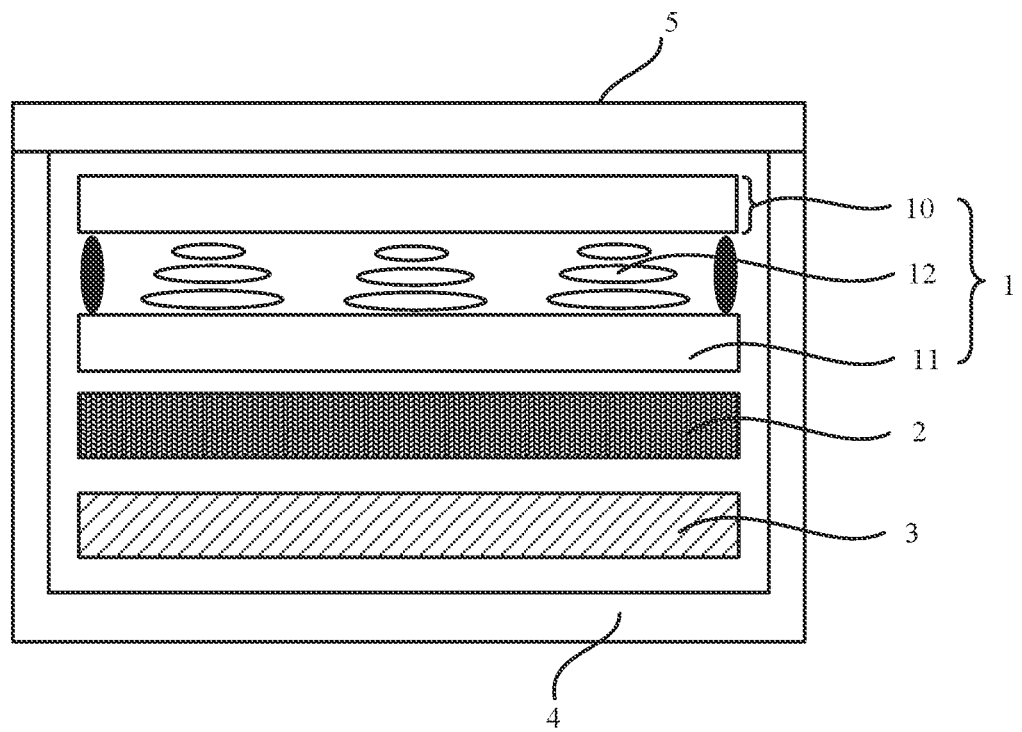
FIG. 1 is a structural diagram of a liquid crystal display apparatus, in accordance with some embodiments of the present disclosure.

Some embodiments of the present disclosure provide a liquid crystal display apparatus. As shown in FIG. 1, the liquid crystal display apparatus mainly includes a liquid crystal display panel 1, a backlight module 2, a circuit board 3, a frame 4, a cover glass 5, and other electronic components.

A longitudinal section of the frame 4 is, for example, U-shaped, and the liquid crystal display panel 1, the backlight module 2, the circuit board 3 and the other electronic components are disposed in the frame 4. The backlight module 2 is disposed below the liquid crystal display panel 1; the circuit board 3 is disposed below the backlight module 2; and the cover glass 5 is disposed on a side of the liquid crystal display panel 1 away from the backlight module 2.

The circuit board 3 is configured to supply signals required for display to the liquid crystal display panel 1. For example, the circuit board 3 is a printed circuit board assembly (PCBA), which includes a printed circuit board (PCB), and a timing controller (TCON), a power management integrated circuit (PMIC), and other integrated circuits (ICs) or circuits disposed on the PCB.

Figure 2A:
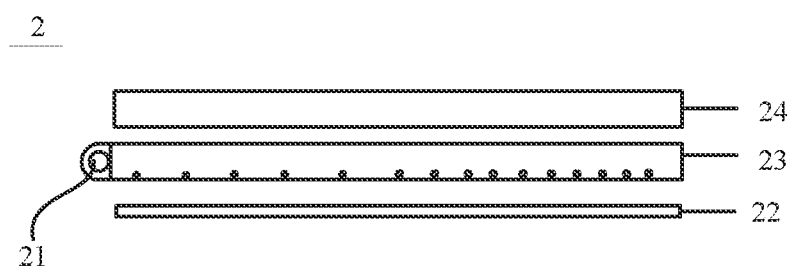
FIG. 2A is a structural diagram of an edge-lit backlight module, in accordance with some embodiments of the present disclosure.
Figure 2B:
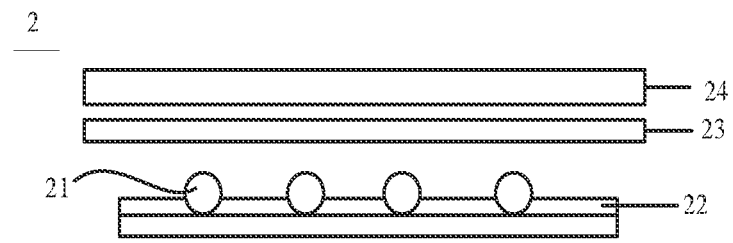
FIG. 2B is a structural diagram of a direct-lit backlight module, in accordance with some embodiments of the present disclosure.

As shown in FIGS. 2A and 2B, the backlight module 2 includes at least one light source 21, a light guide plate 23, and at least one optical film 24 disposed on a light exit side of the light guide plate 23. The at least one optical film 24 includes, for example, a diffusion sheet, or at least one brightness enhancement film (BEF), or a diffusion sheet and at least one BEF. The at least one BEF includes, for example, a prism film and a reflective polarizing dual brightness enhancement film (DBEF).

The light source 21 includes, for example, light-emitting diodes (LEDs). Light emitted by the light source 21 is light in a first wavelength range. The backlight module 2 is configured to provide the liquid crystal display panel 1 with light in the first wavelength range, which is used as incident light of the liquid crystal display panel 1. For example, the light in the first wavelength range may be any one of blue light, purple light or ultraviolet light.

As shown in FIG. 2A, the light source 21 may be disposed on a side face of the light guide plate 23. In this case, the backlight module 2 is an edge-lit backlight module. As shown in FIG. 2B, the light source 21 may also be disposed on a side of the light guide plate 23 away from the light exit side. In this case, the backlight module 2 is a direct-lit backlight module. The structures of the backlight module 2 in FIGS. 2A and 2B are only exemplary, and do not limit the structure of the backlight module 2.

In addition, as shown in FIGS. 2A and 2B, the backlight module 2 may further include a reflective sheet 22. In the edge-lit backlight module, the reflective sheet 22 is disposed on a side of the light guide plate 23 away from the light exit side. In the direct-lit backlight module, the reflective sheet 22 is disposed on a side of the light source 21 away from the light guide plate 23.

Figure 3A:
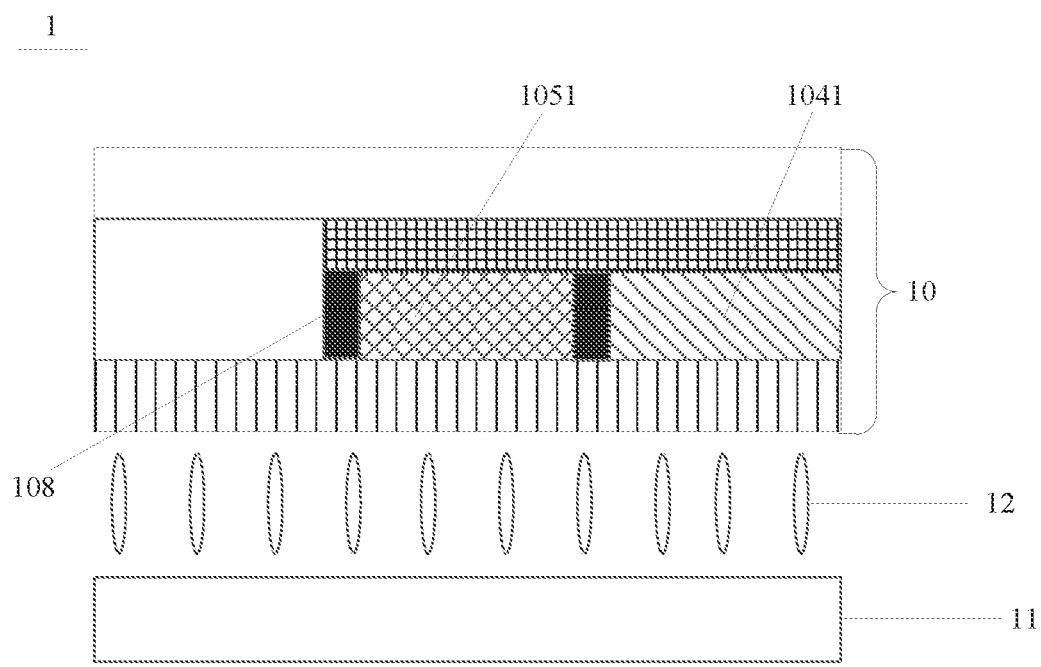
FIG. 3A is a structural diagram of a liquid crystal display panel, in accordance with some embodiments of the present disclosure.
Figure 3B:
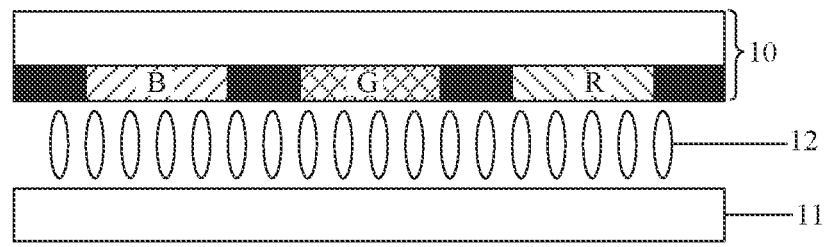
FIG. 3B is a structural diagram of a liquid crystal display panel in the related art.

As shown in FIGS. 1 and 3A, the liquid crystal display panel 1 includes an array substrate 11, a color filter substrate 10, and a liquid crystal layer 12 disposed between the array substrate 11 and the color filter substrate 10. For example, the array substrate 11 and the color filter substrate 10 may be joined together by a sealant, so that liquid crystal molecules in the liquid crystal layer 12 are confined within a region enclosed by the frame sealant.

Figure 4:
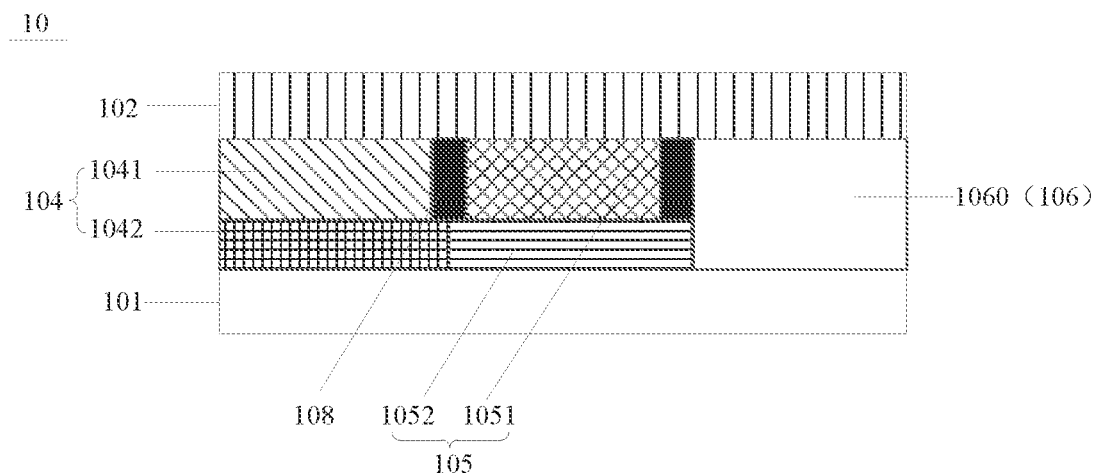
FIG. 4 is a structural diagram of a color filter substrate, in accordance with some embodiments of the present disclosure.
Figure 5:
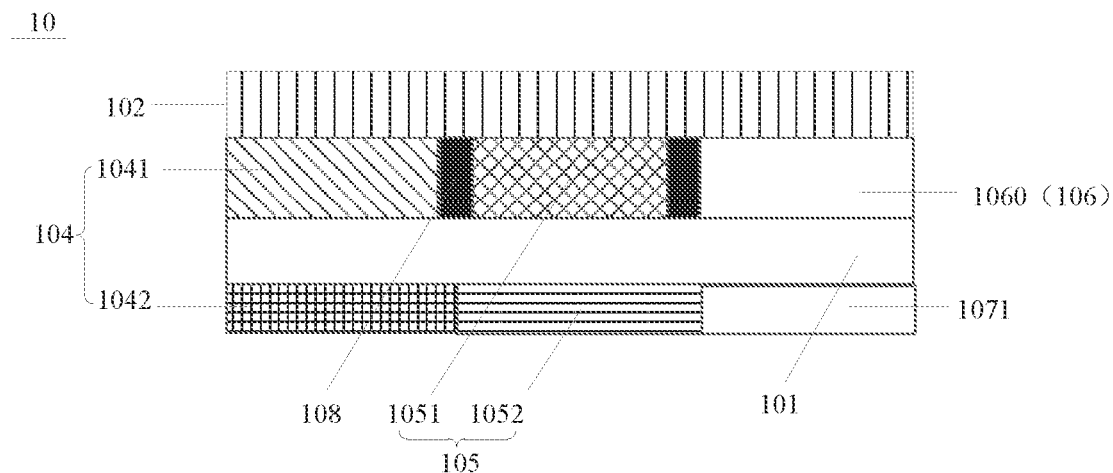
FIG. 5 is a structural diagram of another color filter substrate, in accordance with some embodiments of the present disclosure.

As shown in FIGS. 4 and 5, a color filter substrate 10 provided by some embodiments of the present disclosure includes a first base 101, a first metal wire grid polarizing layer 102 disposed above the first base 101, and a plurality of sub-pixel units disposed on a side of the first metal wire grid polarizing layer 102 away from a first surface thereof. The first surface is a surface of the first metal wire grid polarizing layer 102 away from the first base 101.

The plurality of sub-pixel units includes a plurality of first sub-pixel units 104, a plurality of second sub-pixel units 105 and a plurality of third sub-pixel units 106.

A first sub-pixel unit 104 in the plurality of first sub-pixel units 104 includes a first light conversion pattern 1041 and a first reflective pattern 1042 that are arranged in layers. For example, each first sub-pixel unit 104 of the plurality of first sub-pixel units 104 includes the first light conversion pattern 1041 and the first reflective pattern 1042 that are arranged in layers. The first reflective pattern 1042 is disposed on a side of the first light conversion pattern 1041 away from the first metal wire grid polarizing layer 102. The first light conversion pattern 1041 is configured to emit light in a second wavelength range under excitation of incident light in the first wavelength range, and the first reflective pattern 1042 is configured to reflect the light in the first wavelength range and transmit the light in the second wavelength range.

A second sub-pixel unit 105 in the plurality of second sub-pixel units 105 includes a second light conversion pattern 1051 and a second reflective pattern 1052 that are arranged in layers. For example, each second sub-pixel unit 105 of the plurality of second sub-pixel units 105 includes the second light conversion pattern 1051 and the second reflective pattern 1052 that are arranged in layers. The second reflective pattern 1052 is disposed on a side of the second light conversion pattern 1051 away from the first metal wire grid polarizing layer 102. The second light conversion pattern 1051 is configured to emit light in a third wavelength range under excitation of the incident light in the first wavelength range, and the second reflective pattern 1052 is configured to reflect the light in the first wavelength range and transmit the light in the third wavelength range.

A third sub-pixel unit 106 is configured to receive the light in the first wavelength range, and emit light in a fourth wavelength range or the light of the first wavelength range.

In some embodiments, the light in the first wavelength range is light of a first color, the light in the second wavelength range is light of a second color, the light in the third wavelength range is light of a third color, and the light in the fourth wavelength range is light of a fourth color.

In a case where the third sub-pixel unit 106 is configured to receive the light in the first wavelength range, and emit light in the fourth wavelength range, the light of the second color, the light of the third color, and the light of the fourth color are light of three primary colors. Alternatively, in a case where the third sub-pixel unit 106 is configured to receive the light in the first wavelength range, and emit light in the first wavelength range, the light of the first color, the light of the second color, and the light of the third color are light of three primary colors.

In the related art, as shown in FIG. 38, the color filter substrate 10 includes a first base and a color filter layer disposed on the first base. The color filter layer includes red filter units R, green filter units G, and blue filter units B. The red filter units R, the green filter units G and the blue filter units B are all made of a mixture of polymer material(s) and organic dye(s). In the related art, the backlight module provides white light to the liquid crystal display panel, and the liquid crystal layer 12 of the liquid crystal display panel controls a transmittance of the white light. After passing through the liquid crystal layer 12, the white light is filtered by the color filter layer, thereby realizing display of different colors. However, when the white light emitted from the backlight module passes through the red filter units R, the green filter units G or the blue filter units B of the color filter layer for color conversion, only one of red light, green light and blue light in the white light is transmitted, and other colors of light is absorbed. Therefore, the transmittance is only one third, and at least two thirds of light intensity is lost. As a result, the color filter substrate 10 has a low utilization rate of light.

In the color filter substrate 10 provided by some embodiments of the present disclosure, the first sub-pixel unit 104 includes the first light conversion pattern 1041 and the first reflective pattern 1042, and the second sub-pixel unit 105 includes the second light conversion pattern 1051 and the second reflective pattern 1052. Under the excitation of the light in the first wavelength range provided by the backlight module, the first light conversion pattern 1041 emits the light in the second wavelength range, and the second light conversion pattern 1051 emits the light in the third wavelength range, thereby directly converting the backlight provided by the backlight module into required light. Therefore, it may be possible to improve the color filter substrate 10's utilization rate of light provided by the backlight module. Moreover, both the first reflective pattern 1042 and the second reflective pattern 1052 may reflect the light in the first wavelength range. Therefore, the light in the first wavelength range that has not been converted may be reflected and reused, further improving the utilization rate of light. In addition, the third sub-pixel unit 105 may receive the light in the first wavelength range provided by the backlight module, and emit the light in the fourth wavelength range or the light of the first wavelength range. The light in the second wavelength range, the light in the third wavelength range, and the light in the fourth wavelength range are light of three primary colors, or the light in the first wavelength range, the light in the second wavelength range, and the light in the third wavelength range are light of three primary colors. Therefore, a display apparatus adopting the color filter substrate 10 provided by some embodiments of the present disclosure may realize normal display.

In some embodiments, the third sub-pixel unit 106 includes a transparent filling pattern 1060. That is, the third sub-pixel unit 106 may transmit the light in the first wavelength range.

In this case, for example, the light in the first wavelength range is blue light. For example, the first wavelength range is 421 nm to 505 nm, and the center wavelength is 454 nm. That is, the light of the first color is blue light. The light of the second color and the light of the third color are red light and green light, respectively.

The light source 21 of the backlight module 2 includes, for example, blue light-emitting diodes (LEDs for short). In the related art, the white light is light generally emitted by a phosphor excited by blue light, and approximately forty percent of energy is lost during the process of exciting the phosphor with blue light. In the embodiments of the present disclosure, the blue LEDs serve as the light source 21. That is, blue light emitted by the blue LEDs is directly used as output light of the backlight module 2, which may avoid the energy loss described above.

For example, the first base 101 is a sheet of indium tin oxide (ITO) glass (a sheet of glass on which an ITO film is deposited). The first metal wire grid polarizing (WGP) layer 102 includes a plurality of wire grids arranged in parallel, and a width of a gap between any two adjacent wire grids is the same. The expression "arranged in parallel" herein will be construed as "arranged substantially in parallel". This is because process errors are inevitable, so the conventional understanding of those skilled in the art should be followed. The first metal wire grid polarizing layer 102 is characterized in that it reflects polarized light parallel to an extension direction of the wire grid and transmits polarized light perpendicular to the extension direction of the wire grid.

Figure 6:
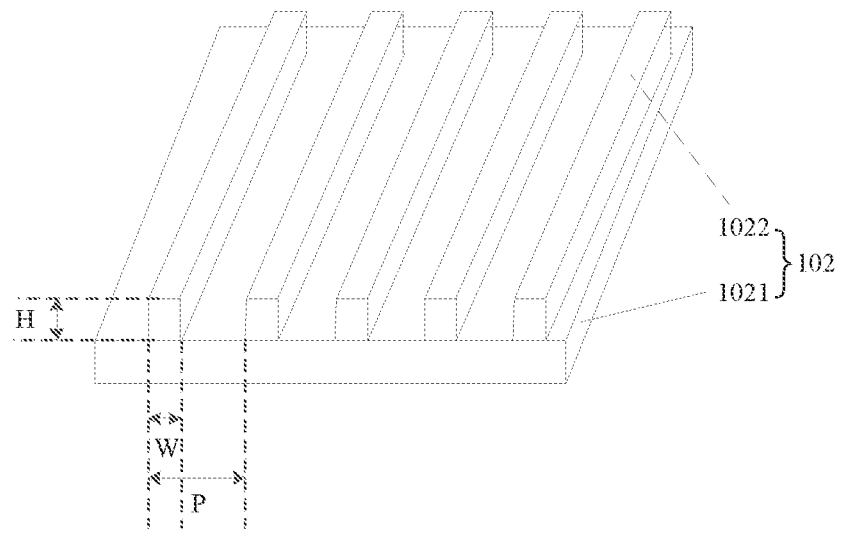
FIG. 6 is a structural diagram of a first metal wire grid polarizing layer, in accordance with some embodiments of the present disclosure.

For example, as shown in FIG. 6, the first metal wire grid polarizing layer 102 includes a substrate 1021 and a plurality of metal wires 1022 that are parallel to one another and disposed on the substrate 1021. The substrate 1021 is provided proximate to the first base 101. When the color filter substrate 10 is manufactured, for example, the substrate 1021 of the manufactured first metal wire grid polarizing layer 102 may be bonded to surfaces of the plurality of sub-pixel units away from the first base 101 through an optical adhesive.

Alternatively, when the color filter substrate 10 is manufactured, the plurality of metal wires 1022 parallel to one another are directly formed on the surfaces of the formed plurality of sub-pixel units away from the first base 101 by a patterning process. In this case, the first metal wire grid polarizing layer 102 only includes the plurality of metal wires 1022 parallel to one another.

A thickness H of the metal wire 1022 is, for example, 100 nm to 300 nm. A width W of the metal wire 1022 is, for example, 20 nm to 100 nm. A distance P between two adjacent metal wires 1022 is, for example, 100 to 150 nm. When polarized light exited from the array substrate 11 enters the first metal wire grid polarizing layer 102, polarized light parallel to an extension direction of the metal wires 1022 is reflected, and polarized light perpendicular to the extension direction of the metal wires 1022 is transmitted.

As for an arrangement manner of the plurality of first sub-pixel units 104, the plurality of second sub-pixel units 105 and the plurality of third sub-pixel units 106, reference may be made to conventional practice in the art.

Figure 7:
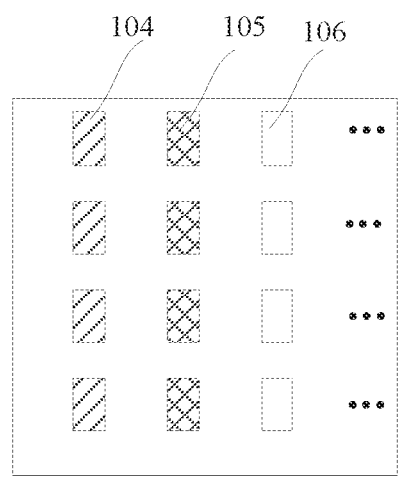
FIG. 7 is a schematic diagram showing an arrangement manner of sub-pixel units, in accordance with some embodiments of the present disclosure.

For example, as shown in FIG. 7, the first sub-pixel unit 104, the second sub-pixel unit 105 and the third sub-pixel unit 106 are arranged periodically along a horizontal direction, and light emitted by the sub-pixel units in a same column along a vertical direction is of a same color.

As for the first sub-pixel unit 104, as shown in FIG. 4, the first light conversion pattern 1041 and the first reflective pattern 1042 in the first sub-pixel unit 104 may both be located between the first base 101 and the first metal wire grid polarizing layer 102. That is, the first sub-pixel unit 104 is located between the first base 101 and the first metal wire grid polarizing layer 102. Or, as shown in FIG. 5, the first light conversion pattern 1041 in the first sub-pixel unit 104 is located between the first base 101 and the first metal wire grid polarizing layer 102, but the first reflective pattern 1042 in the first sub-pixel unit 104 is located on a surface of the first base 101 away from the first metal wire grid polarizing layer 102.

For example, a material of the first light conversion pattern 1041 includes first quantum dots, and the first quantum dots can emit light in the second wavelength range under the excitation of light in the first wavelength range. After the light in the first wavelength range enters the first light conversion pattern 1041, the utilization rate of the light in the first wavelength range by the first light conversion pattern 1041 may not reach 100%, therefore there may be unused light in the first wavelength range. In this case, the first reflective pattern 1042 may reflect light in the first wavelength range that is not used by the first light conversion pattern 1041 into the first light conversion pattern 1041, and the unused light may be used to excite the first light conversion pattern 1041 to emit light again. Moreover, the first reflective pattern 1042 may further prevent the unused light in the first wavelength range from exiting from the color filter substrate 10.

As for the second sub-pixel unit 105, as shown in FIG. 4, the second light conversion pattern 1051 and the second reflective pattern 1052 in the first sub-pixel unit 105 may both be located between the first base 101 and the first metal wire grid polarizing layer. That is, the second sub-pixel unit 105 is located between the first base 101 and the first metal wire grid polarizing layer 102. Or, as shown in FIG. 5, the second light conversion pattern 1051 in the second sub-pixel unit 105 is located between the first base 101 and the first metal wire grid polarizing layer 102, but the second reflective pattern 1052 in the second sub-pixel unit 105 is located on the surface of the first base 101 away from the first metal wire grid polarizing layer 102.

For example, a material of the second light conversion pattern 1051 includes second quantum dots, and the second quantum dots can emit light in the third wavelength range under the excitation of light in the first wavelength range. After the light in the first wavelength range enters the second light conversion pattern 1051, the utilization rate of the light in the first wavelength range by the second light conversion pattern 1051 may not reach 100%, therefore there may be unused light in the first wavelength range. In this case, the second reflective pattern 1052 may reflect light in the first wavelength range that is not used by the second light conversion pattern 1051 into the second light conversion pattern 1051, and the unused light may be used to excite the second light conversion pattern 1051 to emit light again. Moreover, the second reflective pattern 1052 may further prevent the unused light in the first wavelength range from exiting from the color filter substrate 10.

In some embodiments, the material of the first light conversion pattern 1041 includes a combination of the first quantum dots, a photoresist, a coupling agent (for example, a first quantum dot-photoresist coupling agent), etc. The material of the second light conversion pattern 1051 includes a combination of the second quantum dots, a photoresist, a coupling agent (for example, a second quantum dot-photoresist coupling agent), etc. A main difference between the first quantum dot and the second quantum dot lies in a diameter of the quantum dot. For example, a diameter of the first quantum dot is 2.4 nm, and a diameter of the second quantum dot is 1.7 nm.

A material of the first quantum dots and the second quantum dots may include at least one of indium phosphide (InP), indium arsenide (InAs), cadmium sulfide (CdS), cadmium selenide (CdSe), cadmium telluride (CdTe), zinc selenide (ZnSe), and zinc sulfide (ZnS).

The first light conversion pattern 1041 and the second light conversion pattern 1051 may be fabricated by: scattering the first quantum dots and the second quantum dots in phorbol-12-myristate-13-acetate (PMA) respectively, mixing them with a photoresist respectively, and then performing respective spin coating, pre-baking, photolithography, development, post-baking, and other patterning processes to form the first light conversion pattern 1041 and the second light conversion pattern 1051.

In order to scatter the light entering the first light conversion pattern 1041 and the second light conversion pattern 1051 to increase a viewing angle of a screen, the material of each of the first light conversion pattern 1041 and the second light conversion pattern 1051 may further include light diffusion particles. For example, a material of the light diffusion particles includes at least one of polystyrene resin, polymethyl methacrylate, polycarbonate, silicon dioxide, and titanium dioxide.

As for the third sub-pixel unit 106, the transparent filling pattern 1060 does not include quantum dots. After the light in the first wavelength range is directed to the transparent filling pattern 1060, it may directly pass through the transparent filling pattern 1060. As shown in FIGS. 4 and 5, the transparent filling pattern 1060 may be directly disposed on a surface of the first base 101 facing the first metal wire grid polarizing layer 102. A material of the transparent filling pattern 1060 may include, for example, a photoresist.

As shown in FIG. 5, for example, a photoresist may be used to form the planarization pattern 1071.

In some embodiments, as shown in FIG. 4, the first sub-pixel unit 104, the second sub-pixel unit 105, and the third sub-pixel unit 106 are all provided between the first metal wire grid polarizing layer 102 and the first base 101. In this case, the first base 101 may protect the first sub-pixel unit 104, the second sub-pixel unit 105, and the third sub-pixel unit 106, so as to prevent each sub-pixel unit from being damaged, and increase a service life of the liquid crystal display panel 1.

Figure 8:
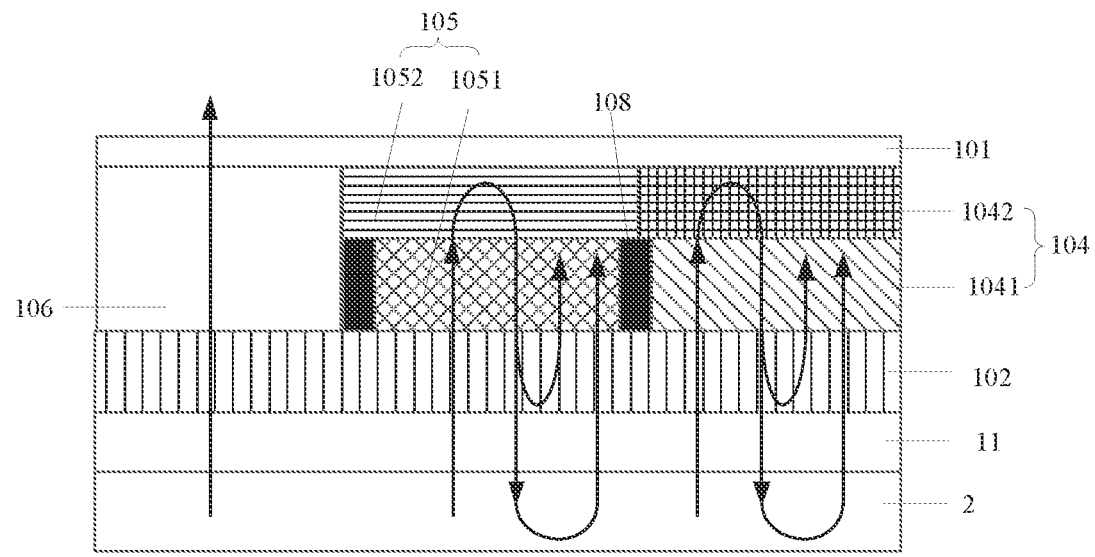
FIG. 8 is a schematic diagram showing a propagation paths of blue light in a liquid crystal display apparatus, in accordance with some embodiments of the present disclosure.

In a case where the color filter substrate 10 is applied to a liquid crystal display apparatus, as shown in FIG. 8, the blue light emitted from the backlight module 2 (i.e., the light in the first wavelength range, as shown by arrow lines in FIG. 8) passes through the array substrate 11, is incident on the first metal wire grid polarizing layer 102, exits from the first metal wire grid polarizing layer 102, and then enters the first sub-pixel unit 104, the second sub-pixel unit 105 and the third sub-pixel unit 106.

As shown in FIG. 8, in the first sub-pixel unit 104, the blue light (i.e., the light in the first wavelength range) first travels toward the first base 101. When the blue light is incident into the first light conversion pattern 1041, part of the blue light is used to excite the first light conversion pattern 1041 to emit light, and the remaining part directly exits from the first light conversion pattern 1041. Therefore, light exiting from the first light conversion pattern 1041 includes both red light (i.e., the light in the second wavelength range) and blue light. After that, when the light exiting from the first light conversion pattern 1041 is incident onto the first reflective pattern 1042, the red light passes through the first reflective pattern 1042 and exits from the first base 101, but the blue light is reflected by the first reflective pattern 1042. The reflected blue light travels away from the first base 101. When the reflected blue light reaches the first light conversion pattern 1041, part of the blue light is used to excite the first light conversion pattern 1041 to emit light again, while the unused blue light continues to travel toward the first metal wire grid polarizing layer 102. Then, part of the unused blue light is reflected by the first metal wire grid polarizing layer 102, and part of the unused blue light travels toward the array substrate 11. The blue light reflected by the first metal wire grid polarizing layer 102 travels toward the first base 101 again according to the above process. As for the blue light transmitted toward the array substrate 11, since the backlight module 2 includes the reflective sheet 22, the blue light is reflected by the reflective sheet 22 when reaching the reflective sheet 22, and then enters the color filter substrate 10.

Similarly, as shown in FIG. 8, in the second sub-pixel unit 105, the blue light first travels toward the first base 101 first. When the blue light is incident into the second light conversion pattern 1051, part of the blue light is used to excite the second light conversion pattern 1051 to emit light, and the remaining part directly exits from the second light conversion pattern 1051. Therefore, light exiting from the second light conversion pattern 1051 includes both green light (i.e., the light in the third wavelength range) and blue light. After that, when the light exiting from the second light conversion pattern 1051 is incident onto the second reflective pattern 1052, the green light passes through the second reflective pattern 1052 and exits from the first base 101, but the blue light is reflected by the second reflective pattern 1052. The reflected blue light travels away from the first base 101. When the reflected blue light reaches the second light conversion pattern 1051, part of the blue light is used to excite the second light conversion pattern 1051 to emit light again, while the unused blue light continues to travel toward the first metal wire grid polarizing layer 102. Then, part of the unused blue light is reflected by the first metal wire grid polarizing layer 102, and part of the unused blue light travels toward the array substrate 11. The blue light reflected by the first metal wire grid polarizing layer 102 travels toward the first base 101 again according to the above process. As for the blue light transmitted toward the array substrate 11, since the backlight module 2 includes the reflective sheet 22, the blue light is reflected by the reflective sheet 22 when reaching the reflective sheet 22, and then enters the color filter substrate 10.

As can be known from the above, with regard to the first sub-pixel unit 104, the blue light may travel back and forth in a first blue light resonant cavity formed by the first metal wire grid polarizing layer 102, the first reflective pattern 1042, and the reflective sheet 22. With regard to the second sub-pixel unit 105, the blue light may travels back and forth in a second blue light resonant cavity formed by the first metal wire grid polarizing layer 102, the second reflective pattern 1052, and the reflective sheet 22. The blue light travels back and forth in the first blue light resonant cavity and the second blue light resonant cavity, and excites the first light conversion pattern 1041 and the second light conversion pattern 1051 to emit light multiple times, thereby improving the utilization rate of the blue light.

In the third sub-pixel unit 106, as shown in FIG. 8, the blue light directly passes through the transparent filling pattern 1060 to travel toward the first base 101, and then exit from the first base 101.

Since the third sub-pixel unit 106 includes the transparent filling pattern 1060, the liquid crystal display panel 1 has a simpler structure and is easier to manufacture. Moreover, the blue light may pass through the third sub-pixel unit 106 basically without obstruction, which improves the transmittance of blue light.

Under ideal conditions, a reflectivity of the first reflective pattern 1042 and the second reflective pattern 1052 to the light in the first wavelength range is 100%, an efficiency of the liquid crystal layer is 100% (that is, the liquid crystal layer does not absorb light), and the first metal wire grid polarizing layer 102 reflects 50% of light and transmits 50% of light. In a case where the materials of the first light conversion pattern 1041 and the second light conversion pattern 1051 include quantum dots, assuming that an absorption rate of the blue light by the quantum dots is 30%, then a light efficiency is 0.30 EQE (external quantum efficiency) if the quantum dots are excited by the blue light only once, and the light efficiency may be increased to 1.34 EQE after the blue light is reflected multiple times and the quantum dots are excited repeatedly. Assuming that the absorption rate of the blue light by the quantum dots is 50%, then the light efficiency is 0.50 EQE if the quantum dots are excited by the blue light only once, and the light efficiency may be increased to 0.92 EQE after the blue light is reflected multiple times and the quantum dots are excited repeatedly. Therefore, the utilization rate of the blue light may be improved significantly.

The embodiments of the present disclosure provide the color filter substrate 10, in which the first light conversion pattern 1041 and the first reflective pattern 1042 are provided in the first sub-pixel unit 104, the second light conversion pattern 1051 and the second reflective pattern 1052 are provided in the second sub-pixel unit 105, and the transparent filling pattern 1060 is provided in the third sub-pixel unit 106. In a case where the color filter substrate 10 is applied to a liquid crystal display apparatus, and the backlight module 2 provides blue backlight, the first sub-pixel unit 104 emits red light, the second sub-pixel unit 105 emits green light, and the third sub-pixel unit 105 emits blue light. In this way, the blue light may travel back and forth between the first metal wire grid polarizing layer 102 and the first reflective pattern 1042 to excite the first light conversion pattern 1041 to emit light, and may travel back and forth between the first metal wire grid polarizing layer 102 and the second reflective pattern 1052 to excite the second light conversion pattern 1051 to emit light. Therefore, the color filter substrate 10 provided by the embodiments of the present disclosure has a higher utilization rate of blue light. In addition, in the case where the first light conversion pattern 1041 and the second light conversion pattern 1051 include quantum dots, since the first light conversion pattern 1041 and the second light conversion pattern 1051 respectively emit red light and green light based on excitation of the quantum dots, the photoluminescence efficiency of the quantum dots is higher; and since the transparent filling pattern 1060 is provided in the third sub-pixel unit 106, the blue light may directly pass through the third sub-pixel unit 106 basically without loss, and the third sub-pixel unit 106 may have a high transmittance of blue light. Therefore, the color filter substrate 10 provided by the embodiments of the present disclosure may significantly increase a light output efficiency of the liquid crystal display apparatus and reduce a power consumption of the liquid crystal display apparatus. Furthermore, since a color filter layer in the related art is made of a mixture of polymer material(s) and organic dye(s), it has a wide light transmission spectrum and a low color purity. In comparison, in the case where the first light conversion pattern 1041 and the second light conversion pattern 1051 both include quantum dots, the quantum dots in the embodiments of the present disclosure have a narrow emission wavelength range and a high color purity. Therefore, in the case where the color filter substrate 10 provided by the embodiments of the present disclosure is applied to the liquid crystal display apparatus, a display color gamut of the liquid crystal display apparatus may be increased from 72% of the NSTC (a standard named after the National Television Standards Committee) color gamut to above 110% of the NTSC, thereby delivering even richer colors and even more vivid picture quality.

Figure 9:
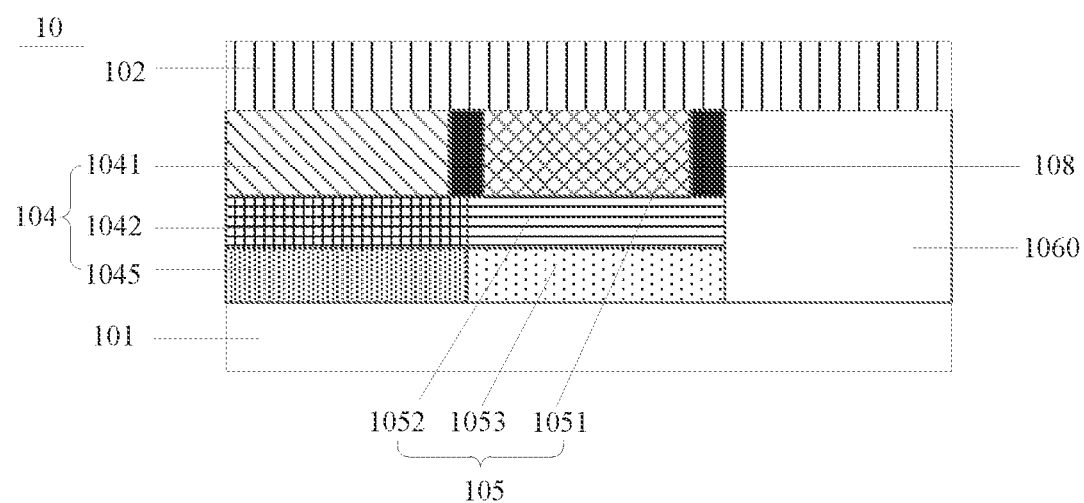
FIG. 9 is a structural diagram of yet another color filter substrate, in accordance with some embodiments of the present disclosure.

In some embodiments, as shown in FIG. 9, the first sub-pixel unit 104 further includes a first absorption pattern 1045 disposed on a side of the first reflective pattern 1042 away from the first light conversion pattern 1041, and the first absorption pattern 1045 is configured to absorb the light in the first wavelength range and transmit the light in the second wavelength range. The second sub-pixel unit 105 further includes a second absorption pattern 1053 disposed on a side of the second reflective pattern 1052 away from the second light conversion pattern 1051, and the second absorption pattern 1053 is configured to absorb the light in the first wavelength range and transmit the light in the third wavelength range.

In some examples, the first absorption pattern 1045 is a red filter pattern, a material of which includes polymer material(s) and organic dye(s). The red filter pattern may absorb light other than red light. The second absorption pattern 1053 is a green filter pattern, a material of which includes polymer material(s) and organic dye(s). The green filter pattern may absorb light other than green light.

In some other examples, a material of the first absorption pattern 1045 and a material of the second absorption pattern 1053 both includes blue light absorbing dye(s). The blue light absorbing dye(s) include at least one of coumarin 540 and benzotriazole. The molecular formula of coumarin 540 is $C_{20}H_{18}N_2O_2S$, and a maximum absorption wavelength of coumarin 540 is 458 nm. The molecular formula of benzotriazole is $C_8H_5N_3$, and a maximum absorption wavelength of benzotriazole is 385 nm. On this basis, the material of the first absorption pattern 1045 may be the same as the material of the second absorption pattern 1053, and adjacent first absorption pattern 1045 and second absorption pattern 1053 are formed into a one-piece structure. The first absorption pattern 1045 and the second absorption pattern 1053 may be fabricated by: dissolving the blue light absorbing dye(s) in an organic solvent; adding them to a photoresist to obtain slurry; forming a film on the first base 101 by spin coating; and then performing pre-baking, photolithography, post-baking, development and other patterning processes to form the first absorption pattern 1045 and the second absorption pattern 1053.

For example, in the fabrication process of the first absorption pattern 1045 and the second absorption pattern 1053, the organic solvent used includes one or more of toluene and tetrahydrofuran.

The first absorption pattern 1045 and the second absorption pattern 1053 are used for absorbing the blue light from the backlight module 2, so that the blue light will not enter the human eyes. In addition, the first absorption pattern 1045 and the second absorption pattern 1053 may also absorb blue light from the external environment, so as to avoid a problem of blue tint on the images displayed by the liquid crystal display panel 1, and thereby further reduce irritation to the eyes caused by blue light.

Figure 10:
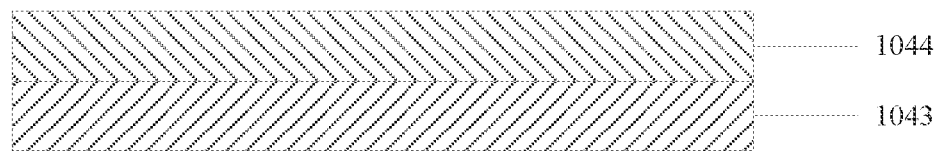
FIG. 10 is a structural diagram of a first reflective pattern, in accordance with some embodiments of the present disclosure.

In some embodiments, as shown in FIG. 10, the first reflective pattern 1042 and the second reflective pattern 1052 both include at least one first reflective sub-pattern 1043 and at least one second reflective sub-pattern 1044 that are stacked along a thickness direction of the first base 101. A material of the at least one first reflective sub-pattern 1043 and a material of the at least one second reflective sub-pattern 1044 both include cholesteric liquid crystals. A helix direction of the cholesteric liquid crystals in the at least one first reflective sub-pattern 1043 is left-handed, and a helix direction of the cholesteric liquid crystals in the at least one second reflective sub-pattern 1044 is right-handed.

For example, the first reflective pattern 1042 and the second reflective pattern 1052 may both reflect light in a wavelength range of 380 nm to 505 nm.

It will be noted that, In the first reflective pattern 1042 or the second reflective pattern 1052, in a case where the total number of the first reflective sub-patterns 1043 and the second reflective sub-patterns 1044 is more than two, the first reflective sub-pattern 1043 and the second reflective sub-pattern 1044 may be alternately arranged. For example, in the first reflective pattern 1042 or the second reflective pattern 1052, in a case where the total number of the first reflective sub-patterns 1043 and the second reflective sub-patterns 1044 is four, they may be alternately arranged in the following manner a first reflective sub-pattern 1043, a second reflective sub-pattern 1044, another first reflective sub-pattern 1043, and then another second reflective sub-pattern 1044.

The first reflective sub-pattern 1043 and the second reflective sub-pattern 1044 may be fabricated by: scattering polymerizable cholesteric liquid crystal monomers, left-handed polymerizable chiral monomers and a photoinitiator in an organic solvent; forming a first cholesteric liquid crystal film with a thickness of 2 μm to 5 μm by scrape coating or spin coating, and then drying, annealing, UV-curing, etc.; then forming a second cholesteric liquid crystal film on a surface of the first cholesteric liquid crystal film by using the same method, the chiral monomers in the second cholesteric liquid crystal film being right-handed polymerizable chiral monomers; finally, performing photoetching, development and other processes on the first cholesteric liquid crystal film and the second cholesteric liquid crystal film to obtain the first reflective sub-pattern 1043 and the second reflective sub-pattern 1044.

For example, in the fabrication process of the first reflective sub-pattern 1043 and the second reflective sub-pattern 1044, the organic solvent used includes one or more of toluene and tetrahydrofuran.

Cholesteric liquid crystal is a special form of nematic liquid crystal. Molecules in the cholesteric liquid crystal are arranged in a periodic spiral along the horizontal plane. Due to the special helix structure of the cholesteric liquid crystal, it is characterized by Bragg reflection. That is, in a case where a wavelength of an incident light satisfies $\lambda=nP$, the incident light will be reflected. Herein, $\lambda$ is the wavelength of the reflected light, P is a pitch of the cholesteric liquid crystal, and N is an average refractive index of the liquid crystal. Since n is relatively fixed, the wavelength of the light expected to be reflected by the cholesteric liquid crystal may be controlled by adjusting the pitch P. The pitch of the cholesteric liquid crystal in the first reflective sub-pattern 1043 and the pitch of the cholesteric liquid crystal in the second reflective sub-pattern 1044 are in a range of 380 nm to 480 nm. The transmittance of cholesteric liquid crystal to light outside a reflection band can reach 90% or even higher. Therefore, by using the cholesteric liquid crystal to reflect the light in the first wavelength range, the reflection efficiency of the first reflective pattern 1042 and the second reflective pattern 1052 to the light in the first wavelength range may be improved.

When the pitch P is adjusted to control the wavelength of the light expected to be reflected by the cholesteric liquid crystal, it may be arranged that the cholesteric liquid crystal of the first reflective sub-pattern 1043 and the cholesteric liquid crystal of the second reflective sub-pattern 1044 have a same pitch, so that the first reflective sub-pattern 1043 and the second reflective sub-pattern 1044 reflect light of a same wavelength.

In some embodiments, a thickness of the first reflective sub-pattern 1043 is 2 μm to 5 μm. For example, the thickness of the first reflective sub-pattern 1043 is 2 μm, 3 μm, 4 μm, or 5 μm. A thickness of the second reflective sub-pattern 1044 is 2 μm to 5 μm. For example, the thickness of the second reflective sub-pattern 1044 is 2 μm, 3 μm, 4 μm, or 5 μm. The thickness of the first reflective sub-pattern 1043 and the thickness of the second reflective sub-pattern 1044 may be the same or different.

By setting the thickness of the first reflective sub-pattern 1043 and the thickness of the second reflective sub-pattern 1044 to the range of 2 μm to 5 μm, it may be possible to reduce the overall thickness of the first reflective pattern 1042 and the overall thickness of the second reflective pattern 1052 as much as possible on the premise of ensuring the reflection effect of light in the first wavelength range, thereby preventing the overall thickness of the color filter substrate 10 from being too large.

Figure 11:
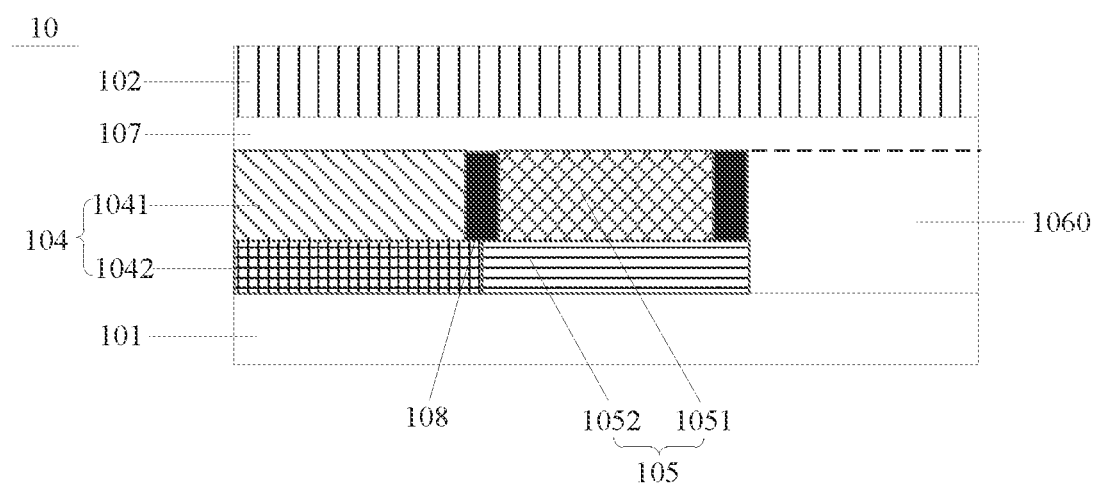
FIG. 11 is a structural diagram of yet another color filter substrate, in accordance with some embodiments of the present disclosure.

In some embodiments, as shown in FIG. 11, the color filter substrate 10 further includes a planarization layer 107 disposed between the first metal wire grid polarizing layer 102 and all of the first light conversion pattern 1041, the second light conversion pattern 1051 and the transparent filling pattern 1060. The planarization layer 107 and the transparent filling pattern 1060 are made of a same material and are formed into a one-piece structure.

The material of the planarization layer 107 and the transparent filling pattern 1060 is, for example, a photoresist.

The planarization layer 107 is used for ensuring the flatness of the surfaces of the first light conversion pattern 1041 and the second light conversion pattern 1051. Therefore, when the first metal wire grid polarizing layer 102 is manufactured, the metal wires 1022 may be directly fabricated on a surface of the planarization layer 107 away from the first base 101 without using a substrate 1021.

In some embodiments, as shown in FIGS. 3A, 4, 5, 8, 9, 11, and 12, the color filter substrate 10 further includes a first light-shielding pattern 108, and the first light-shielding pattern 108 has a grid structure.

For example, as shown in FIGS. 3A, 4, 5, 8, 9, and 11, the first light conversion pattern 1041, the second light conversion pattern 1051, and the transparent filling pattern 1060 are arranged in respective ones of a plurality of squares of the first light-shielding pattern 108. For example, the first light conversion pattern 1041 is arranged in one of the plurality of squares of the first light-shielding pattern 108; the second light conversion pattern 1051 is arranged in one of the plurality of squares of the first light-shielding pattern 108; the transparent filling pattern 1060 is arranged in one of the plurality of squares of the first light-shielding pattern 108; and the first light conversion pattern 1041, the second light conversion pattern 1051 and the transparent filling pattern 1060 are arranged in different squares.

Figure 12:
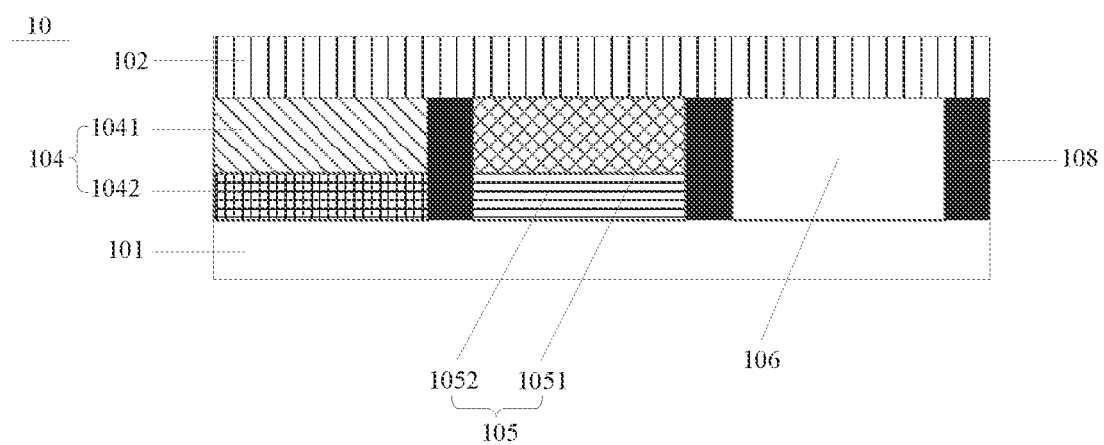
FIG. 12 is a structural diagram of yet another color filter substrate, in accordance with some embodiments of the present disclosure.

Or, as shown in FIG. 12, each sub-pixel unit is arranged in a respective one of the plurality of squares of the first light-shielding pattern 108. For example, each sub-pixel unit is arranged in one of the plurality of squares of the first light-shielding pattern 108, and different sub-pixel units are arranged in different squares of the plurality of squares of the first light-shielding pattern 108.

For example, the first light-shielding layer 108 may be made of black resin.

Figure 13:
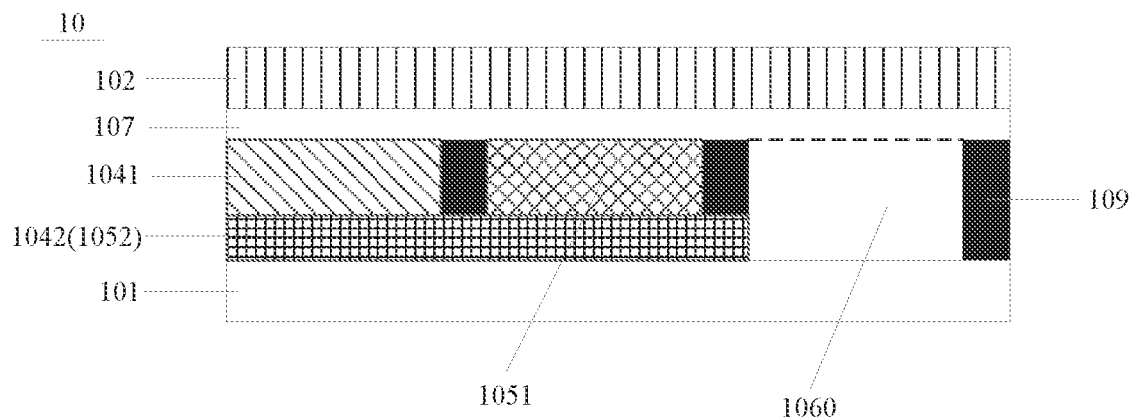
FIG. 13 is a structural diagram of yet another color filter substrate, in accordance with some embodiments of the present disclosure.

In some embodiments, as shown in FIG. 13, the color filter substrate 10 further includes a second light-shielding pattern 109, and the second light-shielding pattern 108 has a grid structure. The first light conversion pattern 1041, the second light conversion pattern 1051, and the transparent filling pattern 1060 are disposed in respective ones of a plurality of squares of the second light-shielding pattern 109. Any adjacent first reflective patterns 1042, any adjacent second reflective patterns 1052, and any adjacent first reflective pattern 1042 and second reflective pattern 1052 are formed into a one-piece structure.

For example, the second light-shielding layer 109 may be made of black resin.

In some embodiments, the first metal wire grid polarizing layer 102 is further used as a common electrode. Since the first metal wire grid polarizing layer 102 is provided with the metal wires 1022 therein, it can be used as the common electrode, which is conducive to simplifying the structure of the color filter substrate 10.

Figure 14:
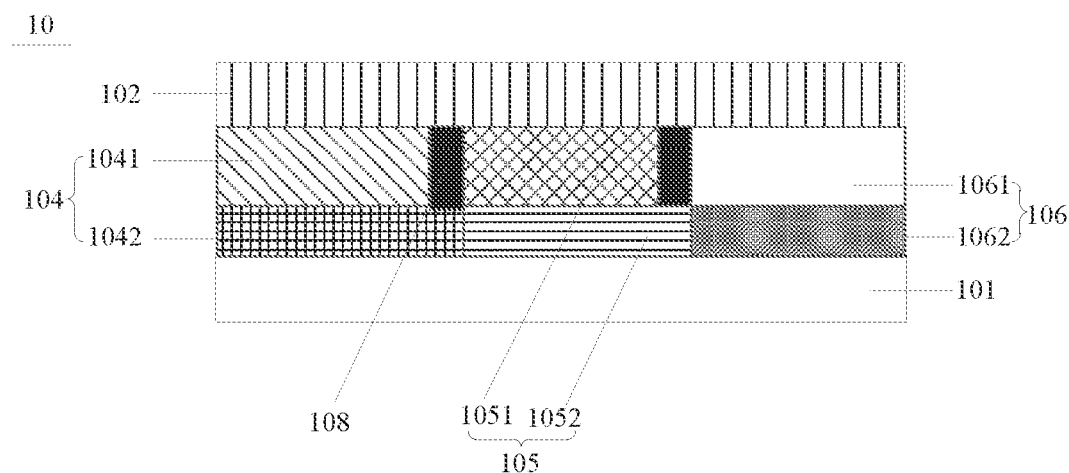
FIG. 14 is a structural diagram of yet another color filter substrate, in accordance with some embodiments of the present disclosure.
Figure 15:
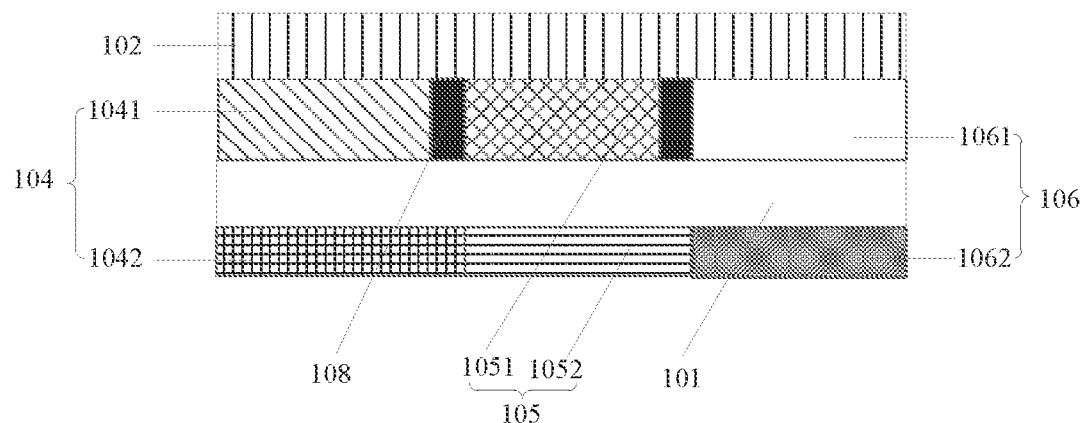
FIG. 15 is a structural diagram of yet another color filter substrate, in accordance with some embodiments of the present disclosure.

Some embodiments of the present disclosure further provide a color filter substrate 10. As shown in FIGS. 14 and 15, the color filter substrate 10 includes a first base 101, a first metal wire grid polarizing layer 102 disposed above the first base 101, and a plurality of sub-pixel units disposed on a side of the first metal wire grid polarizing layer 102 away from a first surface thereof. The first surface is a surface of the first metal wire grid polarizing layer 102 away from the first base 101.

The plurality of sub-pixel units include a plurality of first sub-pixel units 104, a plurality of second sub-pixel units 105 and a plurality of third sub-pixel units 106.

A first sub-pixel unit 104 of the plurality of first sub-pixel units 104 includes a first light conversion pattern 1041 and a first reflective pattern 1042 that are arranged in layers. For example, each first sub-pixel unit 104 of the plurality of first sub-pixel units 104 includes the first light conversion pattern 1041 and the first reflective pattern 1042 that are arranged in layers. The first reflective pattern 1042 is disposed on a side of the first light conversion pattern 1041 away from the first metal wire grid polarizing layer 102. The first light conversion pattern 1041 is configured to emit light in a second wavelength range under excitation of incident light in the first wavelength range, and the first reflective pattern 1042 is configured to reflect the light in the first wavelength range and transmit the light in the second wavelength range.

A second sub-pixel unit 105 of the plurality of second sub-pixel units 105 includes a second light conversion pattern 1051 and a second reflective pattern 1052 that are arranged in layers. For example, each second sub-pixel unit 105 of the plurality of second sub-pixel units 105 includes the second light conversion pattern 1051 and the second reflective pattern 1052 that are arranged in layers. The second reflective pattern 1052 is disposed on a side of the second light conversion pattern 1051 away from the first metal wire grid polarizing layer 102. The second light conversion pattern 1051 is configured to emit light in a third wavelength range under excitation of the incident light in the first wavelength range, and the second reflective pattern 1052 is configured to reflect the light in the first wavelength range and transmit the light in the third wavelength range.

A third sub-pixel unit 106 of the plurality of third sub-pixel units 106 includes a third light conversion pattern 1061 and a third reflective pattern 1062 that are arranged in layers. For example, each third sub-pixel unit 106 of the plurality of third sub-pixel units 106 includes the third light conversion pattern 1061 and the third reflective pattern 1062 that are arranged in layers. The third reflective pattern 1062 is disposed on a side of the third light conversion pattern 1061 away from the first metal wire grid polarizing layer 102. The third light conversion pattern 1061 is configured to emit light in a fourth wavelength range under excitation of the incident light in the first wavelength range, and the third reflective pattern 1062 is configured to reflect the light in the first wavelength range and transmit the light in the fourth wavelength range.

In this case, for example, the light in the first wavelength range is light of a first color, and the light of the first color may be purple light or ultraviolet light. The light in the second wavelength range, the light in the third wavelength range and the light in the fourth wavelength range are light of a second color, light of a third color and light of a fourth color, respectively. The light of the second color, the light of the third color and the light of the fourth color are light of three primary colors. For example, the light of the second color is red light, the light of the third color is green light, and the light of the fourth color is blue light. For another example, the light of the second color is cyan light, the light of the third color is magenta light, and the light of the fourth color is yellow light.

As for structures of the first sub-pixel unit 104 and the second sub-pixel unit 105, reference may be made to the structures of the first sub-pixel unit 104 and the second sub-pixel unit 105 described above, and details will not be repeated here. A structure of the third sub-pixel unit 105 will be mainly described below.

As shown in FIG. 14, the third light conversion pattern 1061 and the third reflective pattern 1062 in the third sub-pixel unit 106 may both be disposed between the first base 101 and the first metal wire grid polarizing layer 102. That is, the third sub-pixel unit 106 is disposed between the first base 101 and the first metal wire grid polarizing layer 102. Or, as shown in FIG. 15, the third light conversion pattern 1061 in the third sub-pixel unit 106 is disposed between the first base 101 and the first metal wire grid polarizing layer 102, and the third reflective pattern 1062 in the third sub-pixel unit 106 is disposed on a surface of the first base 101 away from the first metal wire grid polarizing layer 102.

For example, a material of the third light conversion pattern 1061 includes third quantum dots, and the third quantum dots can emit light in the fourth wavelength range under the excitation of light in the first wavelength range. After the light in the first wavelength range enters the third light conversion pattern 1061, the utilization rate of the light in the first wavelength range by the third light conversion pattern 1061 may not reach 100%, therefore there may be unused light in the first wavelength range. In this case, the third reflective pattern 1062 may reflect light in the first wavelength range that is not used by the third light conversion pattern 1061 into the third light conversion pattern 1061, and the unused light may be used to excite the third light conversion pattern 1061 to emit light again. Moreover, the third reflective pattern 1062 may further prevent the unused light in the first wavelength range from exiting from the color filter substrate 10.

For example, a size of the third quantum dot in the third light conversion pattern 1061 is 1.0 nm.

A material of the third quantum dots includes at least one of indium phosphide (InP), indium arsenide (InAs), cadmium sulfide (CdS), cadmium selenide (CdSe), cadmium telluride (CdTe), zinc selenide (ZnSe), and zinc sulfide (ZnS). The third light conversion pattern 1061 may be fabricated by: scattering the third quantum dots in phorbol-12-myristate-13-acetate (PMA), mixing them with a photoresist, and then performing spin coating, pre-baking, photolithography, development, post-baking, and other patterning processes to form the third light conversion pattern 1061.

It will be noted that, materials of the first light conversion pattern 1041, the second light conversion pattern 1051 and the third light conversion pattern 1061 are not limited to quantum dots. For example, in a case where the light in the first wavelength range is ultraviolet light, the material of the first light conversion pattern may include pyridine 1, an emission wavelength range of which is 665 nm to 725 nm, with a peak value of 698 nm. The material of the second light conversion pattern may include coumarin 153, an emission wavelength range of which is 515 nm to 570 nm, with a peak value of 540 nm. The material of the third light conversion pattern may include coumarin 120, an emission wavelength range of which is 428 nm to 453 nm, with a peak value of 440 nm. Or, the material of the third light conversion pattern may include stilbene 3, an emission wavelength range of which is 414 nm to 445 nm, with a peak value of 425 nm.

In order to scatter the light entering the third light conversion pattern 1061 to increase the viewing angle of the screen, the material of the third light conversion pattern 1061 may further include light diffusion particles. For example, a material of the light diffusion particles includes at least one of polystyrene resin, polymethyl methacrylate, polycarbonate, silicon dioxide, and titanium dioxide.

For example, the third reflective pattern 1062 has a same structure as the first reflective pattern 1042 and the second reflective pattern 1052.

Figure 16:
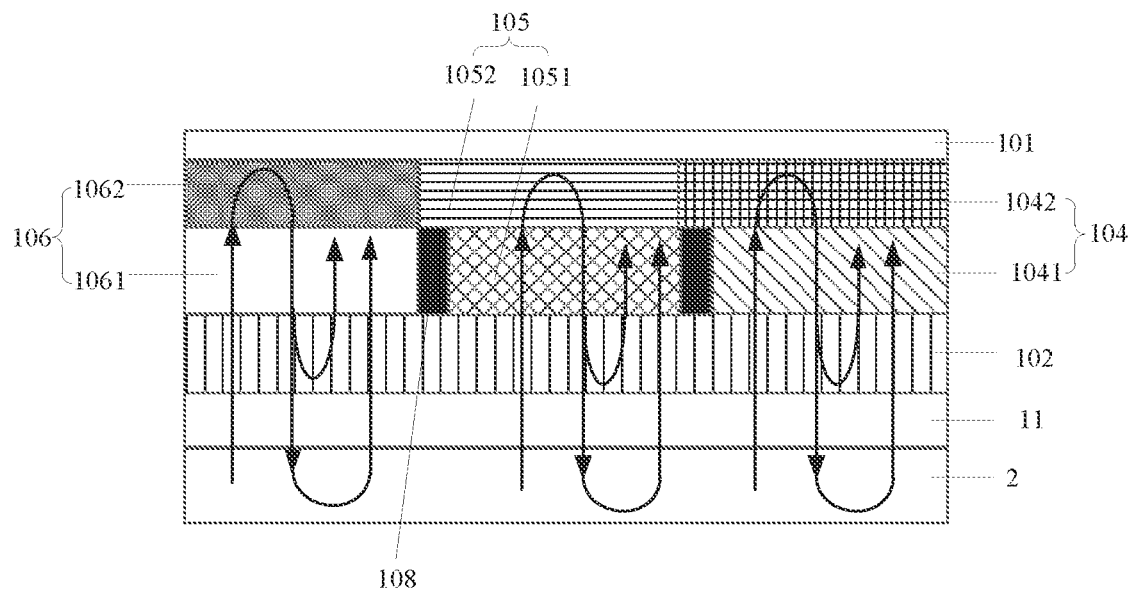
FIG. 16 is a schematic diagram showing a propagation paths of light in a first wavelength range in a liquid crystal display apparatus, in accordance with some embodiments of the present disclosure.

In a case where the color filter substrate 10 is applied to a liquid crystal display apparatus, as shown in FIG. 16, the light in the first wavelength range emitted from the backlight module 2 passes through the array substrate 11, is incident onto the first metal wire grid polarizing layer 102, exits from the first metal wire grid polarizing layer 102, and then enters the first sub-pixel unit 104, the second sub-pixel unit 105 and the third sub-pixel unit 106.

As for propagation paths of the light in the first wavelength range in the first sub-pixel unit 104 and the second sub-pixel unit 105, reference may be made to the propagation paths of the blue light in the first sub-pixel unit 104 and the second sub-pixel unit 105 described above, and details will not be repeated here.

When the light in the first wavelength range enters the third sub-pixel unit 106, the light in the first wavelength range first travels toward the first base 101. When the light in the first wavelength range is incident into the third light conversion pattern 1061, part of the light in the first wavelength range is used to excite the third light conversion pattern 1061 to emit light, and the remaining part directly exits from the third light conversion pattern 1061. Therefore, light exiting from the third light conversion pattern 1061 includes both light in the fourth wavelength range and light in the first wavelength range. After that, when the light exiting from the third light conversion pattern 1061 is incident onto the third reflective pattern 1062, the light in the fourth wavelength range passes through the third reflective pattern 1062 and exits from the first base 101, but the light in the first wavelength range is reflected by the third reflective pattern 1062. The reflected light in the first wavelength range travels away from the first base 101. When the reflected light in the first wavelength range reaches the third light conversion pattern 1061, part of the light in the first wavelength range is used to excite the third light conversion pattern 1061 to emit light again, while the unused light in the first wavelength range continues to travel toward the first metal wire grid polarizing layer 102. Then, part of the unused light in the first wavelength range is reflected by the first metal wire grid polarizing layer 102, and part of the unused light in the first wavelength range travels toward the array substrate 11. The light in the first wavelength range reflected by the first metal wire grid polarizing layer 102 travels toward the first base 101 again according to the above process. As for the light in the first wavelength range transmitted toward the array substrate 11, since the backlight module 2 includes the reflective sheet 22, the light in the first wavelength range is reflected by the reflective sheet 22 when reaching the reflective sheet 22, and then enters the color filter substrate 10.

As can be known from the above, with regard to the third sub-pixel unit 106, the light in the first wavelength range may travel back and forth in a resonant cavity formed by the first metal wire grid polarizing layer 102, the third reflective pattern 1062, and the reflective sheet 22. The light in the first wavelength range travels back and forth in the resonant cavity, and excites the third light conversion pattern 1061 to emit the light in the fourth wavelength range multiple times, thereby improving the utilization rate of the light in the first wavelength range.

Some embodiments of the present disclosure provide the color filter substrate 10, in which the first light conversion pattern 1041 and the first reflective pattern 1042 are provided in the first sub-pixel unit 104, the second light conversion pattern 1051 and the second reflective pattern 1052 are provided in the second sub-pixel unit 105, and the third light conversion pattern 1061 and the third reflective pattern 1062 are provided in the third sub-pixel unit 106. In a case where the color filter substrate 10 is applied to a liquid crystal display apparatus, and the backlight module 2 provides the light in the first wavelength range, the first sub-pixel unit 104 emits the light in the second wavelength range, the second sub-pixel unit 105 emits the light in the third wavelength range, and the third sub-pixel unit 105 emits the light in the fourth wavelength range. In this way, with regard to the first sub-pixel unit 104, the light in the first wavelength range may travel back and forth between the first metal wire grid polarizing layer 102 and the first reflective pattern 1042 to excite the first light conversion pattern 1041 to emit light; with regard to the second sub-pixel unit 105, the light in the first wavelength range may travel back and forth between the first metal wire grid polarizing layer 102 and the second reflective pattern 1052 to excite the second light conversion pattern 1051 to emit light; and with regard to the third sub-pixel unit 106, the light in the first wavelength range may travel back and forth between the first metal wire grid polarizing layer 102 and the third reflective pattern 1062 to excite the third light conversion pattern 1061 to emit light. Therefore, the color filter substrate 10 provided by the embodiments of the present disclosure has a higher utilization rate of the light in the first wavelength range. In addition, in the case where the first light conversion pattern 1041, the second light conversion pattern 1051 and the third light conversion pattern 1061 include quantum dots, since the first light conversion pattern 1041, the second light conversion pattern 1051 and the third light conversion pattern 1061 respectively emit the light in the second wavelength range, the light in the third wavelength range and the light in the fourth wavelength range based on excitation of the quantum dots, the photoluminescence efficiency of the quantum dots is higher. Therefore, the color filter substrate 10 provided by the embodiments of the present disclosure may significantly increase a light output efficiency of the liquid crystal display apparatus and reduce a power consumption of the liquid crystal display apparatus. Furthermore, since a color filter layer in the related art is made of a mixture of polymer material(s) and organic dye(s), it has a wide light transmission spectrum and a low color purity. In comparison, in the case where the first light conversion pattern 1041, the second light conversion pattern 1051 and the third light conversion pattern 1061 all include quantum dots, the quantum dots in the embodiments of the present disclosure have a narrow emission wavelength range and a high color purity. Therefore, in the case where the color filter substrate 10 provided by the embodiments of the present disclosure is applied to the liquid crystal display apparatus, a display color gamut of the liquid crystal display apparatus may be increased from 72% of the NTSC to above 110% of the NTSC, thereby delivering even richer colors and even more vivid picture quality.

Figure 17:
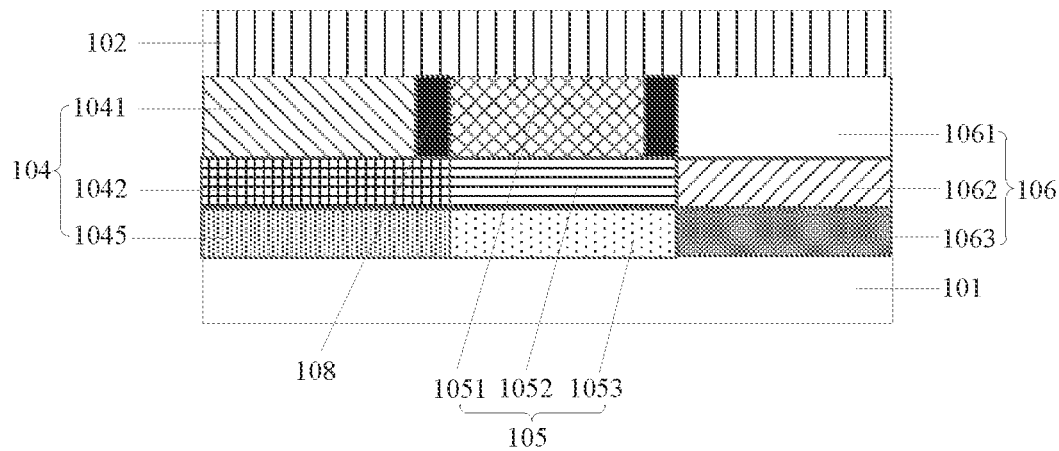
FIG. 17 is a structural diagram of yet another color filter substrate, in accordance with some embodiments of the present disclosure.
Figure 18:
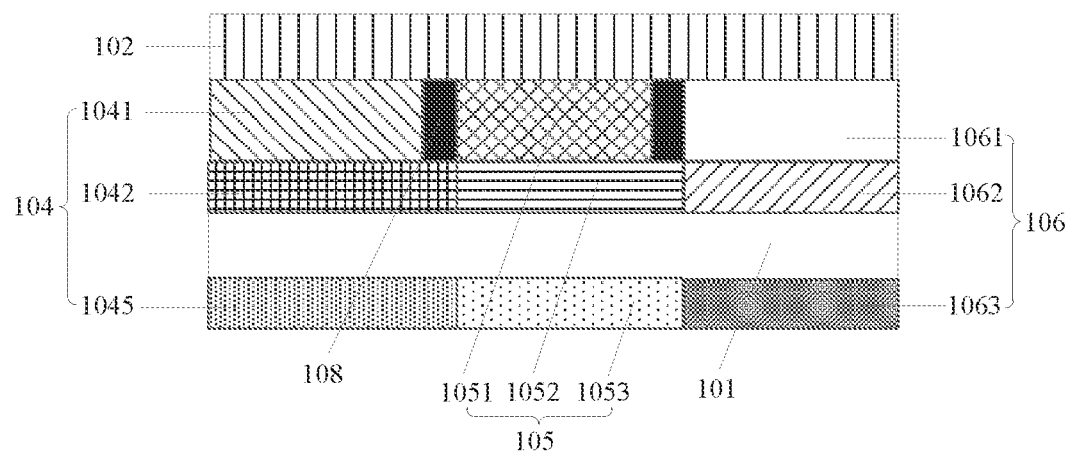
FIG. 18 is a structural diagram of yet another color filter substrate, in accordance with some embodiments of the present disclosure.
Figure 19:
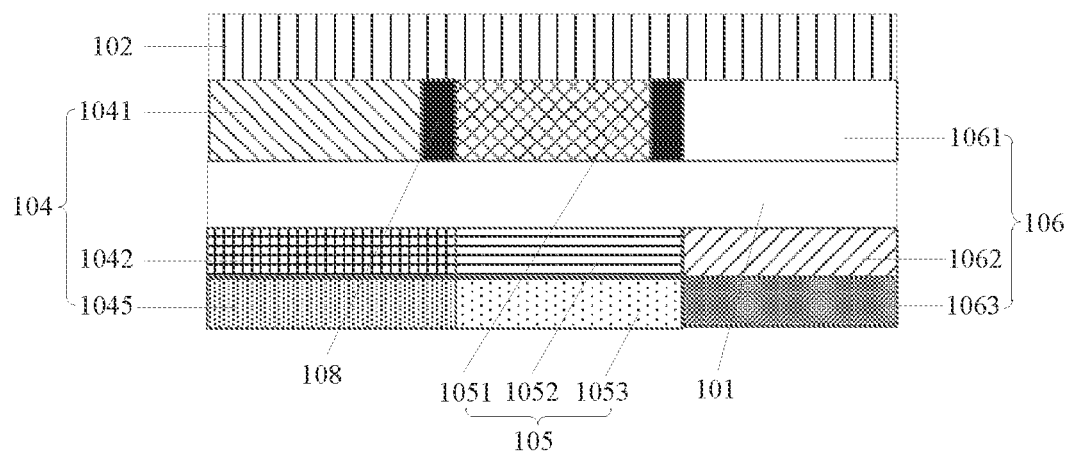
FIG. 19 is a structural diagram of yet another color filter substrate, in accordance with some embodiments of the present disclosure.

In some embodiments, as shown in FIGS. 17 to 19, the third sub-pixel unit 106 further includes a third absorption pattern 1063 disposed on a side of the third reflective pattern 1062 away from the third light conversion pattern 1061.

In a case where the third reflective pattern 1062 is disposed between the third light conversion pattern 1061 and the first base 101, as shown in FIG. 17, the third absorption pattern 1063 may be disposed between the third reflective pattern 1062 and the first base 101. Or, as shown in FIG. 18, the third absorption pattern 1063 is disposed on a surface of the first base 101 away from the first metal wire grid polarizing layer 102. As shown in FIG. 19, in a case where the third reflective pattern 1062 is disposed on a side of the first base 101 away from the first metal wire grid polarizing layer 102, the third absorption pattern 1063 is disposed on a surface of the third reflective pattern 1062 away from the first base 101.

The third absorption pattern 1063 is configured to absorb the light in the first wavelength range and transmit the light in the fourth wavelength range.

For example, in a case where the light in the fourth wavelength range is blue light, the third absorption pattern 1063 may be a blue filter pattern including polymer material(s) and organic dye(s).

Some embodiments of the present disclosure further provide a method of manufacturing a color filter substrate. The method includes S11 to S12.

In S11, as shown in FIG. 4, a plurality of sub-pixel units are formed on a first base 101. The plurality of sub-pixel units include a plurality of first sub-pixel units 104, a plurality of second sub-pixel units 105 and a plurality of third sub-pixels units 106.

In S12, as shown in FIG. 4, a first metal wire grid polarizing layer 102 is formed on a side of the plurality of sub-pixel units away from the first base 101.

Forming the first sub-pixel unit 104, the second sub-pixel unit 105 and the third sub-pixel unit 106 on the first base 101 includes S111 to S112.

In S111, a first reflective pattern 1042 and a second reflective pattern 1052 are formed in a first sub-pixel region and a second sub-pixel region on the first base 101, respectively.

In S112, a first light conversion pattern 1041 is formed on the first reflective pattern 1042 in the first sub-pixel region, a second light conversion pattern 1051 is formed on the second reflective pattern 1052 in the second sub-pixel region, and a transparent filling pattern 1060 is formed in a third sub-pixel region on the first base 101. For example, forming the first light conversion pattern 1041 on the first reflective pattern 1042 includes: forming the first light conversion pattern 1041 on a surface of the first reflective pattern 1042 away from the first base 101. Forming the second light conversion pattern 1051 on the second reflective pattern 1052 includes: forming the second light conversion pattern 1051 on a surface of the second reflective pattern 1052 away from the first base 101.

The first light conversion pattern 1041 is configured to emit light in a second wavelength range under excitation of incident light in a first wavelength range, and the first reflective pattern 1042 is configured to reflect the light in the first wavelength range and transmit the light in the second wavelength range. The second light conversion pattern 1051 is configured to emit light in a third wavelength range under the excitation of incident light in the first wavelength range, and the second reflective pattern 1052 is configured to reflect the light in the first wavelength range and transmit the light in the third wavelength range. For example, the light in the first wavelength range, the light in the second wavelength range and the light in the third wavelength range are light of a first color, light of a second color and light of a third color, respectively. The light of the first color, the light of the second color and the light of the third color are light of three primary colors.

In a case where the first sub-pixel unit 104 includes a first absorption pattern 1045 and the second sub-pixel unit 105 includes a second absorption pattern 1053, before forming the first reflective pattern 1042 and the second reflective pattern 1052, as shown in FIG. 9, the method of manufacturing the color filter substrate further includes:

S10, forming the first absorption pattern 1045 and the second absorption pattern 1053 in the first sub-pixel region and the second sub-pixel region on the first base 101, respectively.

The first absorption pattern 1045 is configured to absorb the light in the first wavelength range and transmit the light in the second wavelength range. The second absorption pattern 1053 is configured to absorb the light in the first wavelength range and transmit the light in the third wavelength range.

Some embodiments of the present disclosure further provide another method of manufacturing a color filter substrate. The method includes S21 to S22.

In S21, as shown in FIG. 14, a plurality of sub-pixel units are formed on a first base 101. The plurality of sub-pixel units include a plurality of first sub-pixel units 104, a plurality of second sub-pixel units 105 and a plurality of third sub-pixels units 106.

In S22, as shown in FIG. 14, a first metal wire grid polarizing layer 102 is formed on a side of the plurality of sub-pixel units away from the first base 101.

Forming the first sub-pixel unit 104, the second sub-pixel unit 105 and the third sub-pixel unit 106 on the first base 101 includes S211 to S212.

In S211, a first reflective pattern 1042, a second reflective pattern 1052 and a third reflective pattern 1062 are formed in a first sub-pixel region, a second sub-pixel region and a third sub-pixel region on the first base 101, respectively.

In S212, a first light conversion pattern 1041 is formed on the first reflective pattern 1042 in the first sub-pixel region, a second light conversion pattern 1051 is formed on the second reflective pattern 1052 in the second sub-pixel region, and a third light conversion pattern 1061 is formed on the third reflective pattern 1062 in the third sub-pixel region. For example, forming the first light conversion pattern 1041 on the first reflective pattern 1042 includes: forming the first light conversion pattern 1041 on a surface of the first reflective pattern 1042 away from the first base 101. Forming the second light conversion pattern 1051 on the second reflective pattern 1052 includes: forming the second light conversion pattern 1051 on a surface of the second reflective pattern 1052 away from the first base 101. Forming the third light conversion pattern 1061 on the third reflective pattern 1062 includes: forming the third light conversion pattern 1061 on a surface of the third reflective pattern 1062 away from the first base 101.

The first light conversion pattern 1041 is configured to emit light in a second wavelength range under excitation of incident light in a first wavelength range, and the first reflective pattern 1042 is configured to reflect the light in the first wavelength range and transmit the light in the second wavelength range. The second light conversion pattern 1051 is configured to emit light in a third wavelength range under the excitation of incident light in the first wavelength range, and the second reflective pattern 1052 is configured to reflect the light in the first wavelength range and transmit the light in the third wavelength range. The third light conversion pattern 1061 is configured to emit light in a fourth wavelength range under the excitation of incident light in the first wavelength range, and the third reflective pattern 1062 is configured to reflect the light in the first wavelength range and transmit the light in the fourth wavelength range. For example, the light in the first wavelength range, the light in the second wavelength range, the light in the third wavelength range, and the light in the fourth wavelength range are light of a first color, light of a second color, light of a third color, and light of a fourth color, respectively. The light of the second color, the light of the third color and the light of the fourth color are light of three primary colors.

As shown in FIG. 17, in a case where the first sub-pixel unit 104 includes a first absorption pattern 1045, the second sub-pixel unit 105 includes a second absorption pattern 1053, and the third sub-pixel unit 106 includes a third absorption pattern 1063, before forming the first reflective pattern 1042, the second reflective pattern 1052 and the third reflective pattern 1062, as shown in FIG. 17, the method of manufacturing the color filter substrate further includes:

S20, forming the first absorption pattern 1045, the second absorption pattern 1053 and the third absorption pattern 1062 in the first sub-pixel region, the second sub-pixel region and the third sub-pixel region on the first base 101, respectively.

The first absorption pattern 1045 is configured to absorb the light in the first wavelength range and transmit the light in the second wavelength range. The second absorption pattern 1053 is configured to absorb the light in the first wavelength range and transmit the light in the third wavelength range. The third absorption pattern 1063 is configured to absorb the light in the first wavelength range and transmit the light in the fourth wavelength range.

The method of manufacturing the color filter substrate 10 has the same beneficial effects as the color filter substrate 10 described above, and details will not be repeated here.

Figure 20:
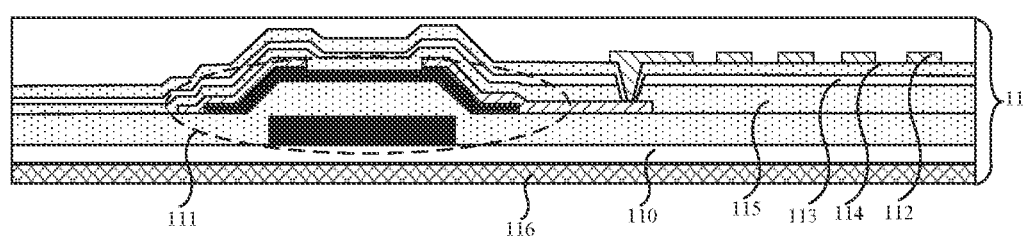
FIG. 20 is a structural diagram of an array substrate, in accordance with some embodiments of the present disclosure.

In some embodiments, as shown in FIG. 20, the array substrate 11 includes a second base 110. The array substrate 10 is provided with a thin film transistor 111 and a pixel electrode 112 that are located on the second base 110 in a region corresponding to each sub-pixel unit of the color filter substrate 10. The thin film transistor 111 includes an active layer, a source, a drain, a gate, and a gate insulating layer. The source and the drain are in contact with the active layer; the pixel electrode 112 is electrically connected to the drain of the thin film transistor 111, and the source of the thin film transistor 111 is electrically connected to a data line.

In some embodiments, in a case where the color filter substrate 10 does not include a common electrode, as shown in FIG. 20, the array substrate 11 further includes a common electrode 113 disposed above the second base 110. The pixel electrode 112 and the common electrode 113 may be disposed in a same layer. In this case, the pixel electrode 112 and the common electrode 113 are both comb structures including a plurality of strip-shaped sub-electrodes. The pixel electrode 112 and the common electrode 113 may also be disposed in different layers. In this case, as shown in FIG. 20, a first insulating layer 114 is provided between the pixel electrode 112 and the common electrode 113. In a case where the common electrode 113 is disposed between the thin film transistor 111 and the pixel electrode 112, as shown in FIG. 20, a second insulating layer 115 is further provided between the common electrode 113 and the thin film transistor 111.

In some embodiments, the array substrate 11 further includes a polarizing layer, and a polarization direction of the first metal wire grid polarizing layer 102 is parallel or perpendicular to a polarization direction of the polarizing layer.

In some embodiments, the polarizing layer is a second metal wire grid polarizing layer 116. The second metal wire grid polarizing layer 116 is disposed on a side of the second base 110 of the array substrate 11 proximate to the color filter substrate 10 or away from the color filter substrate 10.

For example, as shown in FIG. 20, the second metal wire grid polarizing layer 116 is disposed on a surface of the second base 110 of the array substrate 11 away from the color filter substrate 10.

In a case where the array substrate 11 is provided with the second metal wire grid polarizing layer 116, when light in the first wavelength range (polarized light) transmitted from the first metal wire grid polarizing layer 102 toward the backlight module 2 reaches the second metal wire grid polarizing layer 116, the light in the first wavelength range will pass through the second metal wire grid polarizing layer 116 and continue to be transmitted to the backlight module 2, and then be reflected by the reflective sheet 22 in the backlight module 2. The reflected light will pass through the second metal wire grid polarizing layer 116 and the first metal wire grid polarizing layer 102 again to reach the sub-pixel units, and be used to excite the sub-pixel units to emit light. In this way, the utilization rate of the light in the first wavelength range of the liquid crystal display panel 1 may be further improved.

The forgoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A color filter substrate, comprising:
   a first base;
   a first metal wire grid polarizing layer disposed above the first base; and
   a plurality of sub-pixel units disposed on a side of the first metal wire grid polarizing layer away from a first surface thereof, wherein the first surface is a surface of the first metal wire grid polarizing layer away from the first base;
   the plurality of sub-pixel units include a plurality of first sub-pixel units, a plurality of second sub-pixel units and a plurality of third sub-pixel units;
   a first sub-pixel unit of the plurality of first sub-pixel units includes a first light conversion pattern and a first reflective pattern that are arranged in layers, and the first reflective pattern is disposed on a side of the first light conversion pattern away from the first metal wire grid polarizing layer; the first light conversion pattern is configured to emit light of a second color under excitation of incident light of a first color, and the first reflective pattern is configured to reflect the light of the first color and transmit the light of the second color;
   a second sub-pixel unit of the plurality of second sub-pixel units includes a second light conversion pattern and a second reflective pattern that are arranged in layers, and the second reflective pattern is disposed on a side of the second light conversion pattern away from the first metal wire grid polarizing layer; the second light conversion pattern is configured to emit light of a third color under the excitation of the incident light of the first color, and the second reflective pattern is configured to reflect the light of the first color and transmit the light of the third color;
   a third sub-pixel unit of the plurality of third sub-pixel units is configured to receive the light of the first color and emit light of a fourth color or the light of the first color; and
   the light emitted by the first sub-pixel unit, the light emitted by the second sub-pixel unit, and the light emitted by the third sub-pixel unit are light of three primary colors, wherein
   the first sub-pixel unit further includes a first absorption pattern disposed on a side of the first reflective pattern away from the first light conversion pattern, and the first absorption pattern is configured to absorb the light of the first color and transmit the light of the second color; and
   the second sub-pixel unit further includes a second absorption pattern disposed on a side of the second reflective pattern away from the second light conversion pattern, and the second absorption pattern is configured to absorb the light of the first color and transmit the light of the third color; and
   wherein the third sub-pixel unit is configured to emit the light of the first color; the third sub-pixel unit includes a transparent filling pattern; the light of the first color is blue light, and the light of the second color and the light of the third color are red light and green light, respectively;
   or,
   the third sub-pixel unit of the plurality of third sub-pixel units is configured to emit the light of the fourth color, the third sub-pixel unit includes a third light conversion pattern and a third reflective pattern that are arranged in layers, and the third reflective pattern is disposed on a side of the third light conversion pattern away from the first metal wire grid polarizing layer; the third light conversion pattern is configured to emit the light of the fourth color under the excitation of the incident light of the first color, and the third reflective pattern is configured to reflect the light of the first color and transmit the light of the fourth color.

2. The color filter substrate according to claim 1, wherein
   a material of the first light conversion pattern includes first quantum dots;
   a material of the second light conversion pattern includes second quantum dots;
   materials of the first quantum dots and the second quantum dots include at least one of indium phosphide, indium arsenide, cadmium sulfide, cadmium selenide, cadmium telluride, zinc selenide, and zinc sulfide; and
   a diameter of the first quantum dots and a diameter of the second quantum dots are different.

3. The color filter substrate according to claim 1, wherein
   the first reflective pattern and the second reflective pattern both include at least one first reflective sub-pattern and at least one second reflective sub-pattern that are stacked along a thickness direction of the first base;
   a material of the at least one first reflective sub-pattern and a material of the at least one second reflective sub-patter both include cholesteric liquid crystals; a helix direction of the cholesteric liquid crystals in the at least one first reflective sub-pattern is left-handed, and a helix direction of the cholesteric liquid crystals in the at least one second reflective sub-pattern is right-handed.

4. The color filter substrate according to claim 3, wherein a thickness of each first reflective sub-pattern is 2 μm to 5 μm; and a thickness of each second reflective sub-pattern is 2 μm to 5 μm.

5. The color filter substrate according to claim 1, wherein
   a material of the first absorption pattern and a material of the second absorption pattern both include a blue light absorbing dye; and the blue light absorbing dye includes at least one of coumarin and benzotriazole.

6. The color filter substrate according to claim 5, wherein the material of the first absorption pattern is same as the material of the second absorption pattern, and adjacent first absorption pattern and second absorption pattern are form into a one-piece structure.

7. The color filter substrate according to claim 1, wherein the first absorption pattern is a red filter pattern, and the second absorption pattern is a green filter pattern; and the red filter pattern and the green filter pattern both include a polymer material and an organic dye.

8. The color filter substrate according to claim 1, wherein in a case where the third sub-pixel unit is configured to emit the light of the first color, and the third sub-pixel unit includes the transparent filling pattern, the color filter substrate further comprises:
- a planarization layer disposed between the first metal wire grid polarizing layer and all of the first light conversion pattern, the second light conversion pattern and the transparent filling pattern; wherein
- the planarization layer and the transparent filling pattern are made of a same material and are formed into a one-piece structure.

9. The color filter substrate according to claim 1, wherein the first sub-pixel unit, the second sub-pixel unit and the third sub-pixel unit are all disposed between the first metal wire grid polarizing layer and the first base.

10. The color filter substrate according to claim 9, further comprising
- a first light-shielding pattern, wherein the first light-shielding pattern has a grid structure; and
- each sub-pixel unit is arranged in a respective one of a plurality of squares of the first light-shielding pattern.

11. The color filter substrate according to claim 1, wherein in a case where the third sub-pixel unit is configured to emit the light of the first color, and the third sub-pixel unit includes the transparent filling pattern, the color filter substrate further comprises:
- a second light-shielding pattern, wherein the second light-shielding pattern has a grid structure;
- each of the first light conversion pattern, the second light conversion pattern and the transparent filling pattern are arranged in a respective one of a plurality of squares of the second light-shielding pattern;
- any adjacent first reflective patterns, any adjacent second reflective patterns, and any adjacent first reflective pattern and second reflective pattern are formed into a one-piece structure.

12. The color filter substrate according to claim 1, wherein the first metal wire grid polarizing layer is further used as a common electrode.

13. A liquid crystal display panel, comprising an array substrate and the color filter substrate according to claim 1, wherein
- the array substrate is provided with a polarizing layer, and a polarization direction of the first metal wire grid polarizing layer is parallel or perpendicular to a polarization direction of the polarizing layer.

14. The liquid crystal display panel according to claim 13, wherein
- the array substrate includes a second base; the polarizing layer is a second metal wire grid polarizing layer, and the second metal wire grid polarizing layer is disposed on a side of the second base proximate to the color filter substrate or away from the color filter substrate.

15. A liquid crystal display apparatus, comprising the liquid crystal display panel according to claim 13, and a backlight module, wherein
- the backlight module includes at least one light source and a reflective sheet, and the at least one light source is configured to emit the light of the first color.

16. A method of manufacturing a color filter substrate, comprising:
- forming a plurality of sub-pixel units on a first base, the plurality of sub-pixel units including a plurality of first sub-pixel units, a plurality of second sub-pixel units and a plurality of third sub-pixels units; and
- forming a first metal wire grid polarizing layer on a side of the plurality of sub-pixel units away from the first base; wherein forming a first sub-pixel unit, a second sub-pixel unit and a third sub-pixel unit on the first base, includes:
- forming a first absorption pattern and a second absorption pattern in a first sub-pixel region and a second sub-pixel region on the first base, respectively;
- forming a first reflective pattern and a second reflective pattern in the first sub-pixel region and the second sub-pixel region on the first base, respectively;
- forming a first light conversion pattern on the first reflective pattern in the first sub-pixel region;
- forming a second light conversion pattern on the second reflective pattern in the second sub-pixel region; and
- forming a transparent filling pattern in a third sub-pixel region on the first base, wherein
- the first light conversion pattern is configured to emit light of a second color under excitation of incident light of a first color, the first reflective pattern is configured to reflect the light of the first color and transmit the light of the second color, and the first absorption pattern is configured to absorb the light of the first color and transmit the light of the second color; the second light conversion pattern is configured to emit light of a third color under the excitation of the incident light of the first color, the second reflective pattern is configured to reflect the light of the first color and transmit the light of the third color, and the second absorption pattern is configured to absorb the light of the first color and transmit the light of the third color; and
- the light of the first color, the light of the second color and the light of the third color are blue light, red light and green light, respectively.

17. A method of manufacturing a color filter substrate, comprising:
- forming a plurality of sub-pixel units on a first base, the plurality of sub-pixel units including a plurality of first sub-pixel units, a plurality of second sub-pixel units and a plurality of third sub-pixels units; and
- forming a first metal wire grid polarizing layer on a side of the plurality of sub-pixel units away from the first base; wherein
- forming a first sub-pixel unit, a second sub-pixel unit and a third sub-pixel unit on the first base, includes:
- forming a first absorption pattern, a second absorption pattern and a third absorption pattern in a first sub-pixel region, a second sub-pixel region and a third sub-pixel region on the first base, respectively;
- forming a first reflective pattern, a second reflective pattern and a third reflective pattern in the first sub-pixel region, the second sub-pixel region and the third sub-pixel region on the first base, respectively;
- forming a first light conversion pattern on the first reflective pattern in the first sub-pixel region;
- forming a second light conversion pattern on the second reflective pattern in the second sub-pixel region; and
- forming a third light conversion pattern on the third reflective pattern in the third sub-pixel region, wherein
- the first light conversion pattern is configured to emit light of a second color under excitation of incident light of a first color, the first reflective pattern is configured to reflect the light of the first color and transmit the light of the second color, and the first absorption pattern is configured to absorb the light of the first color and transmit the light of the second color; the second light conversion pattern is configured to emit light of a third color under the excitation of the incident light of the first color, the second reflective pattern is configured to reflect the light of the first color and transmit the light of the third color, and the second absorption pattern is configured to absorb the light of the first color and transmit the light of the third color; the third light conversion pattern is configured to emit light of a fourth color under the excitation of the incident light of the first color, the third reflective pattern is configured to reflect the light of the first color and transmit the light of the fourth color, and the third absorption pattern is configured to absorb the light of the first color and transmit the light of the fourth color; and the light of the second color, the light of the third color and the light of the fourth color are light of three primary colors.

* * * * *